(12) United States Patent
Brown et al.

(10) Patent No.: US 7,024,255 B1
(45) Date of Patent: Apr. 4, 2006

(54) EVENT DRIVEN MOTION SYSTEMS

(75) Inventors: David W. Brown, Bingen, WA (US); Jay S. Clark, Bingen, WA (US)

(73) Assignee: Roy-G-Biv Corporation, Bingen, WA (US)

( * ) Notice: Subject to any disclaimer, the term of this patent is extended or adjusted under 35 U.S.C. 154(b) by 3 days.

(21) Appl. No.: 10/923,149

(22) Filed: Aug. 19, 2004

Related U.S. Application Data

(63) Continuation of application No. 10/151,807, filed on May 20, 2002, now Pat. No. 6,885,898.

(60) Provisional application No. 60/292,082, filed on May 18, 2001, provisional application No. 60/291,847, filed on May 18, 2001, provisional application No. 60/292,083, filed on May 18, 2001, provisional application No. 60/297,616, filed on Jun. 11, 2001.

(51) Int. Cl.
*G05B 19/18* (2006.01)

(52) U.S. Cl. ............... 700/56; 700/65; 700/66; 700/170; 700/245; 700/257; 701/1; 701/2; 901/1

(58) Field of Classification Search ............ 700/56, 700/61, 64, 65, 66, 170, 245, 257; 318/567, 318/568.1, 586.11, 568.12, 568.13; 701/1, 701/2; 709/204; 901/1, 3, 50
See application file for complete search history.

(56) References Cited

U.S. PATENT DOCUMENTS

| | | |
|---|---|---|
| 4,159,417 A | 6/1979 | Rubincam |
| 4,199,814 A | 4/1980 | Rapp et al. |
| 4,418,381 A | 11/1983 | Molusis et al. |
| 4,531,182 A | 7/1985 | Hyatt |
| 4,688,195 A | 8/1987 | Thompson et al. |
| 4,713,808 A | 12/1987 | Gaskill |
| 4,767,334 A | 8/1988 | Thorne et al. |
| 4,769,771 A | 9/1988 | Lippmann et al. |
| 4,782,444 A | 11/1988 | Munshi et al. |
| 4,800,521 A | 1/1989 | Carter et al. |
| 4,809,335 A | 2/1989 | Rumsey |
| 4,815,011 A | 3/1989 | Mizuno et al. |
| 4,840,602 A | 6/1989 | Rose |

(Continued)

FOREIGN PATENT DOCUMENTS

DE 0 281 427 B1 8/1992

(Continued)

OTHER PUBLICATIONS

Microsoft Corporation; "Dynamic Data Exchange"; *Windows 3.1 SDK Guide to Programming*; 1992, 1993; Chapter 22; 21 pages.

(Continued)

*Primary Examiner*—Ramesh Patel
(74) *Attorney, Agent, or Firm*—Michael R. Schacht; Schacht Law Office, Inc.

(57) ABSTRACT

A motion system comprising a motion enabled device, an event source, a plurality of message transceivers, and a motion services system. The motion enabled device performs motion operations based on motion commands. The event source generates motion messages upon the occurrence of events, where the motion messages correspond to motion operations. The motion messages are transmitted among the plurality of message transceivers. The motion services system maps motion messages transmitted between the plurality of message transceivers to motion commands based on motion operations corresponding to mapped motion messages. The motion services system performs motion operations based on motion commands corresponding to mapped motion messages.

22 Claims, 16 Drawing Sheets

U.S. PATENT DOCUMENTS

| | | |
|---|---|---|
| 4,846,693 A | 7/1989 | Baer |
| 4,855,725 A | 8/1989 | Fernandez |
| 4,857,030 A | 8/1989 | Rose |
| 4,887,966 A | 12/1989 | Gellerman |
| 4,897,835 A | 1/1990 | Gaskill |
| 4,912,650 A | 3/1990 | Tanaka et al. |
| 4,923,428 A | 5/1990 | Curran |
| 4,937,737 A | 6/1990 | Schwane et al. |
| 4,987,537 A | 1/1991 | Kawata |
| 5,005,135 A | 4/1991 | Morser et al. |
| 5,020,021 A | 5/1991 | Kaji et al. |
| 5,095,445 A | 3/1992 | Sekiguchi |
| 5,120,065 A | 6/1992 | Driscoll et al. |
| 5,126,932 A | 6/1992 | Wolfson et al. |
| 5,168,441 A | 12/1992 | Onarheim et al. |
| 5,175,684 A | 12/1992 | Chong |
| 5,175,817 A | 12/1992 | Adams et al. |
| 5,175,856 A | 12/1992 | Van Dyke et al. |
| 5,245,703 A | 9/1993 | Hubert |
| 5,247,650 A | 9/1993 | Judd et al. |
| 5,377,258 A | 12/1994 | Bro |
| 5,390,304 A | 2/1995 | Leach et al. |
| 5,390,330 A | 2/1995 | Talati |
| 5,392,207 A | 2/1995 | Wilson et al. |
| 5,400,345 A * | 3/1995 | Ryan, Jr. .................. 714/727 |
| 5,402,518 A | 3/1995 | Lowery |
| 5,412,757 A | 5/1995 | Endo |
| 5,438,529 A | 8/1995 | Rosenberg et al. |
| 5,450,079 A | 9/1995 | Dunaway |
| 5,453,933 A * | 9/1995 | Wright et al. ............... 700/181 |
| 5,465,215 A | 11/1995 | Strickland et al. |
| 5,491,813 A | 2/1996 | Bondy et al. |
| 5,493,281 A | 2/1996 | Owens |
| 5,511,147 A | 4/1996 | Abdel-Malek |
| 5,541,838 A | 7/1996 | Koyama et al. |
| 5,576,727 A | 11/1996 | Rosenberg et al. |
| 5,596,994 A | 1/1997 | Bro |
| 5,600,373 A | 2/1997 | Chui et al. |
| 5,604,843 A | 2/1997 | Shaw et al. |
| 5,607,336 A | 3/1997 | Lebensfeld et al. |
| 5,608,894 A | 3/1997 | Kawakami et al. |
| 5,617,528 A | 4/1997 | Stechmann et al. |
| 5,623,582 A | 4/1997 | Rosenberg |
| 5,625,821 A | 4/1997 | Record et al. |
| 5,636,994 A | 6/1997 | Tong |
| 5,652,866 A | 7/1997 | Aldred et al. |
| 5,655,945 A | 8/1997 | Jani |
| 5,666,161 A | 9/1997 | Kohiyama et al. |
| 5,670,992 A | 9/1997 | Yasuhara et al. |
| 5,691,897 A | 11/1997 | Brown et al. |
| 5,691,898 A | 11/1997 | Rosenberg et al. |
| 5,701,140 A | 12/1997 | Rosenberg et al. |
| 5,707,289 A | 1/1998 | Watanabe et al. |
| 5,724,074 A | 3/1998 | Chainani et al. |
| 5,733,131 A | 3/1998 | Park |
| 5,734,373 A | 3/1998 | Rosenberg et al. |
| 5,737,523 A | 4/1998 | Callaghan et al. |
| 5,739,811 A | 4/1998 | Rosenberg et al. |
| 5,746,602 A | 5/1998 | Kikinis |
| 5,752,880 A | 5/1998 | Gabai et al. |
| 5,754,855 A | 5/1998 | Miller et al. |
| 5,764,155 A | 6/1998 | Kertesz et al. |
| 5,790,178 A | 8/1998 | Shibata et al. |
| 5,800,268 A | 9/1998 | Molnick |
| 5,801,946 A | 9/1998 | Nissen et al. |
| 5,805,785 A | 9/1998 | Dias et al. |
| 5,818,537 A | 10/1998 | Enokida et al. |
| 5,821,920 A | 10/1998 | Rosenberg et al. |
| 5,821,987 A | 10/1998 | Larson |
| 5,822,207 A | 10/1998 | Hazama et al. |
| 5,825,308 A | 10/1998 | Rosenberg |
| 5,828,575 A | 10/1998 | Sakai |
| 5,846,132 A | 12/1998 | Junkin |
| 5,848,415 A | 12/1998 | Guck |
| 5,852,441 A | 12/1998 | Nakajima et al. |
| 5,855,483 A | 1/1999 | Collins et al. |
| 5,867,385 A | 2/1999 | Brown et al. |
| 5,873,765 A | 2/1999 | Rifkin et al. |
| 5,889,670 A | 3/1999 | Schuler et al. |
| 5,889,672 A | 3/1999 | Schuler et al. |
| 5,890,963 A | 4/1999 | Yen |
| 5,907,704 A | 5/1999 | Gudmundson et al. |
| 5,907,831 A | 5/1999 | Lotvin et al. |
| 5,914,876 A | 6/1999 | Hirai |
| 5,920,476 A | 7/1999 | Hennessey et al. |
| 5,924,013 A | 7/1999 | Guido et al. |
| 5,956,484 A | 9/1999 | Rosenberg et al. |
| 5,959,613 A | 9/1999 | Rosenberg et al. |
| 5,960,085 A | 9/1999 | De La Huerga |
| 5,977,951 A | 11/1999 | Danieli et al. |
| 6,012,961 A | 1/2000 | Sharpe et al. |
| 6,020,876 A | 2/2000 | Rosenberg et al. |
| 6,028,593 A | 2/2000 | Rosenberg et al. |
| 6,031,973 A | 2/2000 | Gomi et al. |
| 6,038,603 A | 3/2000 | Joseph |
| 6,046,727 A | 4/2000 | Rosenberg et al. |
| 6,057,828 A | 5/2000 | Rosenberg et al. |
| 6,061,004 A | 5/2000 | Rosenberg |
| 6,065,365 A * | 5/2000 | Ostler et al. .................. 74/528 |
| 6,070,010 A | 5/2000 | Keenleyside et al. |
| 6,078,308 A | 6/2000 | Rosenberg et al. |
| 6,078,968 A | 6/2000 | Lo et al. |
| 6,083,104 A | 7/2000 | Choi |
| 6,090,156 A | 7/2000 | MacLeod |
| 6,100,874 A | 8/2000 | Schena et al. |
| 6,101,425 A | 8/2000 | Govindaraj et al. |
| 6,101,530 A | 8/2000 | Rosenberg et al. |
| 6,104,158 A | 8/2000 | Jacobus et al. |
| 6,125,385 A | 9/2000 | Wies et al. |
| 6,128,006 A | 10/2000 | Rosenberg et al. |
| 6,131,097 A | 10/2000 | Peurach et al. |
| 6,133,867 A * | 10/2000 | Eberwine et al. ............. 342/29 |
| 6,139,177 A | 10/2000 | Venkatraman et al. |
| 6,144,895 A | 11/2000 | Govindaraj et al. |
| 6,147,647 A | 11/2000 | Tassoudji et al. |
| 6,161,126 A | 12/2000 | Wies et al. |
| 6,166,723 A | 12/2000 | Schena et al. |
| 6,169,540 B1 | 1/2001 | Rosenberg et al. |
| 6,173,316 B1 | 1/2001 | De Boor et al. |
| 6,191,774 B1 | 2/2001 | Schena et al. |
| 6,195,592 B1 | 2/2001 | Schuler et al. |
| 6,209,037 B1 | 3/2001 | Brown et al. |
| 6,216,173 B1 | 4/2001 | Jones et al. |
| 6,219,032 B1 | 4/2001 | Rosenberg et al. |
| 6,219,033 B1 | 4/2001 | Rosenberg et al. |
| 6,232,891 B1 | 5/2001 | Rosenberg |
| 6,233,545 B1 | 5/2001 | Datig |
| 6,243,078 B1 | 6/2001 | Rosenberg |
| 6,246,390 B1 | 6/2001 | Rosenberg |
| 6,252,579 B1 | 6/2001 | Rosenberg et al. |
| 6,252,853 B1 | 6/2001 | Ohno |
| 6,259,382 B1 | 7/2001 | Rosenberg |
| 6,271,833 B1 | 8/2001 | Rosenberg et al. |
| 6,278,439 B1 | 8/2001 | Rosenberg et al. |
| 6,285,351 B1 | 9/2001 | Chang et al. |
| 6,288,705 B1 | 9/2001 | Rosenberg et al. |
| 6,288,716 B1 | 9/2001 | Humpleman et al. |
| 6,290,565 B1 | 9/2001 | Galyean III et al. |
| 6,292,170 B1 | 9/2001 | Chang et al. |
| 6,292,174 B1 | 9/2001 | Mallett et al. |
| 6,292,712 B1 | 9/2001 | Bullen |
| 6,292,714 B1 | 9/2001 | Okabayashi |
| 6,295,530 B1 | 9/2001 | Ritchie et al. |
| 6,300,936 B1 | 10/2001 | Braun et al. |

| | | | |
|---|---|---|---|
| 6,300,937 | B1 | 10/2001 | Rosenberg |
| 6,301,634 | B1 | 10/2001 | Gomi et al. |
| 6,304,091 | B1 | 10/2001 | Shahoian et al. |
| 6,309,275 | B1 | 10/2001 | Fong et al. |
| 6,310,605 | B1 | 10/2001 | Rosenberg et al. |
| 6,317,116 | B1 | 11/2001 | Rosenberg et al. |
| 6,317,871 | B1 | 11/2001 | Andrews et al. |
| 6,343,349 | B1 | 1/2002 | Braun et al. |
| 6,353,850 | B1 | 3/2002 | Wies et al. |
| 6,366,272 | B1 | 4/2002 | Rosenberg et al. |
| 6,366,273 | B1 | 4/2002 | Rosenberg et al. |
| 6,374,255 | B1 | 4/2002 | Peurach et al. |
| 6,400,996 | B1 | 6/2002 | Hoffberg et al. |
| 6,442,451 | B1 | 8/2002 | Lapham |
| 6,519,594 | B1 | 2/2003 | Li |
| 6,542,925 | B1 * | 4/2003 | Brown et al. ............... 709/208 |
| 6,571,141 | B1 | 5/2003 | Brown |
| 6,652,378 | B1 | 11/2003 | Cannon et al. |
| 6,678,713 | B1 | 1/2004 | Mason et al. |
| 6,885,898 | B1 * | 4/2005 | Brown et al. ................ 700/65 |
| 2001/0020944 | A1 | 9/2001 | Brown et al. |
| 2001/0029443 | A1 | 10/2001 | Miyahira |
| 2001/0032268 | A1 | 10/2001 | Brown et al. |
| 2001/0037492 | A1 | 11/2001 | Holzmann |
| 2002/0052939 | A1 | 5/2002 | Lee |
| 2002/0165627 | A1 | 11/2002 | Brown et al. |
| 2002/0165708 | A1 | 11/2002 | Kumhyr |
| 2002/0177453 | A1 | 11/2002 | Chen et al. |
| 2003/0069998 | A1 | 4/2003 | Brown et al. |

FOREIGN PATENT DOCUMENTS

| | | |
|---|---|---|
| DE | 0 583 908 A2 | 2/1994 |
| EP | 0442676 A2 | 8/1991 |
| EP | 0508912 A1 | 10/1992 |
| EP | 821522 A2 | 1/1998 |
| EP | 0275826 A1 | 7/1998 |
| GB | 2 224 896 A | 12/1991 |
| JP | 59 228473 | 6/1983 |
| JP | 8161335 A | 6/1996 |
| JP | 2000020114 A | 1/2000 |
| WO | WO 92/11731 | 7/1992 |
| WO | WO 93/08654 | 4/1993 |
| WO | WO 95/07504 | 3/1995 |

OTHER PUBLICATIONS

Microsoft Corporation; "Dynamic Data Exchange Management Library"; *Win32 SDK: Prog. Ref.* vol. 2; 1992, 1993; Chapter 77; 26 pages.
Microsoft Corporation; "Network Dynamic Data Exchange"; *Windows for Workgroups 3.1 Resource Kit*; 1992, 1993; Chapter 11; 19 pages.
WOSA Backgrounder: Delivering Enterprise Services to the Windows-based Desktop, Jul. 1993, Microsoft Development Library; pp. 1-19.
Wosa Inside Windows 95; pp. 348-351.
Software Products for Industrial Automation, ICONICS, Inc.; 1993; 6 pages.
WEB 3.0 Product Brochure, Trihedral Engineering Ltd. (1994); 6 pages.
The Complete, Computer-Based Automation Tool (IGSS) Seven Technologies A/S; 6 pages.
Oregon Micro Systems, Inc.; Precision Motion Controls Product Guide: pp. 1-20.
Aimax-Win Product Brochure, TA Engineering Co., Inc.; 1993; 8 pages.
XANALOG Model NL-SIM Product Brochure, XANALOG, 1994, 4 pages.
ExperTune PID Tuning Software, Gerry Engineering Software; 1993; 6 pages.
PMAC Product Catalog, 1992; p. 43.
Paragon TNT Product Brochure, Intec Controls Corp.; 6 pages.
Aerotech Motion Control Product Guide; pp. 233-234.
OpenBatch Product Brief, PID, Inc.; 1994; 6 pages.
PC/DSP-Series Motion Controller C Programming Guide; 1992; pp. 1-54.
FIX Product Brochure, Intellution (1994); 6 pages.
Compumotor Digiplan (1993-94) Catalog pp. 10-11.
Sue Chen Jonathon Lin; *Computer Numerical Control: Essentials in Programming and Networking*; Part V, Chapter 27; 1994; pp. 824-848; Delmar Publishers, Inc.; U.S.
Pritschow et al.; "Open System Controllers: Challenge for the Future of the Machine Tool Industry"; pub. Jan. 15, 1993; pp. 449-452.
William E. Ford; "What Is an Open Architecture Robot Controller" pub. Aug. 16, 1994; pp. 27-32.
Marcos et al.; "A New Solution for Integrating Control Devices Involved in Computer-Integrated Manufacturing"; pub. Sep. 2, 1996; pp. 485-490.
Chu and Wang; "Development of a Practical SFC System for CNC Machine Shop"; pub. 1994; pp. 362-367.
MICROSOFT; "The Microsoft Object Technology Strategy"; pub. Mar. 1994; pp. 1-33.
MICROSOFT; "Open Systems: Technology, Leadership, and Collaberation"; pub. Mar. 1994; pp. 1-15.
MICROSOFT; Microsoft OLE Today and Tomorrow: Technology Overview; pub. Dec. 1993; pp. 1-9.
MICROSOFT; "Object Linking and Embedding 2.0 Backgrounder"; pub. Sep. 1993; pp. 1-15.
Robert Anderson; "SMART: A Modular Architecture for Robotics and Teleoperation"; pub. 1993; pp. 416-421.
Proctor et al.; "Validation of Standard Interfaces for Machine Control"; pub. 1996; pp. 659-664.
Altintas et al.; "Design and Analysis of a Modular CNC System"; pub. Mar. 4, 1990; pp. 305-316.
Wright et al.; "Open Architecture Manufacturing: The Impact of Open-System Computers on Self-sustaining Machinery and the Machine Tool Industry"; pp. 41-47.
Protoctor et al.; "Open Architecture Controllers"; pub. Jun. 1997; pp. 60-64.
Lutz et al.; "OSACA-The Vendor-Neutral Control Architecture"; pub. Dec. 1997; pp. 247-256.
Morales et al.; "A Generalised Software Control System for Industrial Robots"; pub. 1998; pp. 411-416.
Feng et al.; "Distributed Control of a Multiple-Tethered Mobile Robot System for Highway Maintenance and Construction"; pub Nov. 1997; pp. 383-392.
Fedrowitz; IRL-Based Expansion of the Commonly Used High-Level Language C for Robot Programming: pub. Oct. 1995; 5 pages.
Szabo et al.; "Validation Results of Specifications for Motion Control Interoperability"; pub. Sep. 1997; pp. 166-176.
Chang et al.; "Development and Implementation of an Application Programming Interface for PV/DSP-based Motion Control System"; pub. 1998; pp. 94-105.
Erol et al.; "Open System Architecture Modular Tool Kit for Motion and Machine Control"; pub. Sep. 2000; pp. 281-291.
Mizukawa et al.; "OriN: Open Robot Interface for the Network: A Proposed Standard"; pub. May 2000; pp. 344-350.
Michaloski et al.; "A Framework for Component-base CNC Machines" pub. Nov. 1998; pp. 132-143.
Bouzouia et al.; "A Three-layer Workcell Control Architecture Design"; pub. May 1998; pp. 1185-1191.

Morales et al.; "GENERIS: The EC-JRC Generalized Software Control System for Industrial Robots"; pub. 1999; pp. 26-33.

Muir et al.; "Mechatronic Objects for Real-time Control Software Development"; pub. Nov. 1998; pp. 251-265.

Cho et al.; "A Compact/Open Network-based Controller Incorporating Modular Software Architecture for a Humanoid Robot"; pub. 1999; pp. 341-355.

Ge et al.; "A One-stop Solution in Robotic Control System Design"; pub. Sep. 2000; pp. 42-55.

McGraw et al.; "A Friendly Command, Control, and Information System for Astronomy"; pub. 1996; pp. 356-367.

Jackman; "Robotic Control Using Sequential Function Charts"; pub. 1996; pp. 120-128.

Mizukawa et al.; "De-facto Standard API for Open and Networked Industrial Robots"; pub. Oct. 1999; pp. 455-462.

Leu et al.; "A Telemanufacturing Workcell over the Internet"; pub. Nov. 1998; pp. 230-237.

Natale et al.; "Robust Hybrid Force/Position Control with Experiments on an Industrial Robot"; pub. Sep. 19, 1999, pp. 956-961.

Nilsson et al.; "Integrated Architecture for Industrial Robot Programming and Control"; pub. Dec. 31, 1999; pp. 205-226.

Valera et al.; "Interactive Online Evaluation of Robot Motion Control"; pub. Aug. 22, 1999; pp. 1039-1043.

"NEMI Low-cost Controller Project"; pub. Dec. 1996; total pp. 392.

Sperling; "Designing Applications for an OSACA Control"; pub. Nov. 16, 1997; 5 pages.

Sperling et al.; "Enabling Open Control Systems: An Introduction to the OSACA System Platform"; pub. May 1996; pp. 1-8.

OMAC Requirements Document; "Requirements of Open Modular Architecture Controllers for Applications in the Automotive Industry"; pub. Dec. 13, 1994; pp. 1-13.

GM Powertrain Group Manufacturing Engineering Controls Council; "Open, Modular Architecture Controls at GM Powertrain"; pub. May 14, 1996; pp. 1-33.

Team ICLP API Working Group; "Technologies Enabling Agile Manufacturing (TEAM) Intelligent Closed Loop Processing"; pub. Jan. 11, 1996; 30 pages.

Bradley Bargen and Peter Donnely; *Inside Direct X—In Depth Techniques for Developing High-Performance Multimedia Applications*; 1988; Chps. 1, 18-20, 22-27; Microsoft Press; U.S.

Peter Kovach; *Inside Direct3D—The Definitive Guide for Real-Time 3D Power and Performance for Microsoft Windows*; 2000; Chps. 1, 7, 15; Microsoft Press; U.S.

M. Farsi and M. Barbosa; *CANopen Implementation—Applications to Industrial Networks*; 2000; Research Studies Press Ltd.; England and U.S.

Wolfhard Lawrenz; *CAN System Engineering—From Theory to Practical Applications*; 1997; Springer-Verlay New York, Inc.; U.S.

Allen-Bradley; "CNCnet Software Library"; Oct., 1992; Publication 8000-6.1.1; U.S.

Robert Bosch GmbH; "CAN Specification"; Sep., 1991; Version 2.0.

Sisco, Inc.; "Overview and Introduction to the Manufacturing Message Specification (MMS)"; 1994-1995; Revision 2; Systems Integration Specialists Company, Inc.; Sterling Heights, Michigan, U.S.

ISO-9506-1 "Industrial Automation Systems—Manufacturing Message Specification—Part 1: Service definition"; Aug., 2000; pp. i-22; ISO/IEC; Switzerland.

ISO-9506-2 "Industrial Automation Systems—Manufacturing Message Specification—Part 2: Protocol specification"; Aug. 2000; pp. i.-6; ISO/IEC; Switzerland.

Sisco, Inc.; "MMS-EASE"; Jan. 1996; Systems Integration Specialists Company, Inc.; Sterling Heights, Michigan, U.S.

ANSI/EIA-484-A "Electrical and Mechanical Interface Characteristics and Line Control Protocol Using Communication Control Characters for Serial Data Link Between a Direct Numerical Control System and Numerical Control Equipment Employing Asynchronous Full Duplex Transmission"; Jun., 1995; Electronic Industries Association; U.S.

ISO/IEC 7498-1 "Information Technology—Open Systems Interconnection-Basic Reference Model: The Basic Model"; Nov. 1994; U.S.

ISO/IEC 7498-3 "Information Technology—Open Systems Interconnection-Basic Reference Model: Naming and Addressing"; Apr. 1997; U.S.

Todd J. Schuett; "The Benefits and Data Bottlenecks of High Speed Milling"; Aug., 1995; conference paper presented at Southeastern Michigan Chapter American Mold Builders Association; Creative Technology Corporation; U.S.

Todd J. Schuett; "The Ultimate DNC; Direct CNC Networking (DCN)"; *Modern Machine Shop*; Jan., 1996; Creative Technology Corporation; U.S.

Todd J. Schuett; "Advanced Controls for High Speed Milling"; conference paper presented at the SME "High Speed Machining" conference; May 7-8, 1996; Creative Technology Corporation; U.S.

Leitao, Machado & Lopes; "A Manufacturing Cell Integration Solution"; paper developed at CCP as a part of the ESPRIT 5629 Project; Oct., 1995.

Mitsubishi Electric; *Mitsubishi Electric Advance: Programmable Logic Controllers Edition*; Sep., 1996; vol. 76; Mitsubishi Electric Corporation; Tokyo.

Farsi, M.; "Flexible and Reliable Robotics Cells in Factory Automation"; 1993; pp. 520-525.

Chu & Wang; "Development of a Practical SFC System for CNC Machine Shop"; *International Conference on Data and Knowledge Systems for Manufacturing and Engineering*; May 1994; pp. 362-367, vol. 1; pp. xx+745, vol. 2.; Chinese Univ.; Hong Kong.

Farsi, M.; "Device Communication for Flexible Manufacturing:-A New Concept"; 1994; pp. 328-334.

Farsi, M.; "A Production Cell Communication Model in Factory Automation Using the Controller Area Network"; 1995; pp. 90-95.

Katayama et al.; "A Motion Control System with Event-driven Motion-module Switching Mechanism for Robotic Manipulators"; *IEEE International Workshop on Robot and Human Communication*; Jul., 1993; pp. 320-325; U.S.

Matsui et al.; "An Event-Driven Architecture for Controlling Behaviors of the Office Conversant Mobile Robot, *Jijo-2*"; *Proceedings of the 1997 IEEE International Conference on Robotics and Automation*: Apr. 1997; pp. 3367-3372; U.S.

Microsoft Corporation; "How to Write and Use ActiveX Controls for Microsoft Windows CE 3.0"; *Windows CE 3.0 Technical Articles*: Jun., 2000; pp. 1-5.

Microsoft Corporation; "Notes on Implementing an OLE Control Container"; *ActiveX Controls Technical Articles*; Sep. 21, 1994; pp. 1-47.

Microsoft Corporation; "What OLE Is Really About"; *OLE (General) Technical Articles*; Jul., 1996; pp. 1-33.

Microsoft Corporation; "Categorizing by Component Capabilities"; *Platform SDK: COM*; Nov., 2001; pp. 1-23.

* cited by examiner

EVENT DRIVEN MOTION SYSTEMS

RELATED APPLICATIONS

This is a continuation of U.S. patent application Ser. No. 10/151,807 filed May 20, 2002 now U.S. Pat. No. 6,885,898, which claims priority U.S. Provisional Patent Application Ser. Nos. 60/292,082 filed on May 18, 2001, 60/291,847 filed on May 18, 2001, 60/292,083 filed on May 18, 2001, and 60/297,616 filed on Jun. 11, 2001.

FIELD OF THE INVENTION

The present invention relates to motion systems and, more particularly, to systems and methods for causing motion based on remotely generated events.

BACKGROUND OF THE INVENTION

The present invention is of particular use in motion systems that perform desired movements based on motion commands.

SUMMARY OF THE INVENTION

The present invention is a motion system comprising a motion enabled device, an event source, a plurality of message transceivers, and a motion services system. The motion enabled device performs motion operations based on motion commands. The event source generates motion messages upon the occurrence of events, where the motion messages correspond to motion operations. The motion messages are transmitted among the plurality of message transceivers. The motion services system maps motion messages transmitted between the plurality of message transceivers to motion commands based on motion operations corresponding to mapped motion messages. The motion services system performs motion operations based on motion commands corresponding to mapped motion messages.

BRIEF DESCRIPTION THE DRAWING

DETAILED DESCRIPTION OF THE INVENTION

Figure 1:
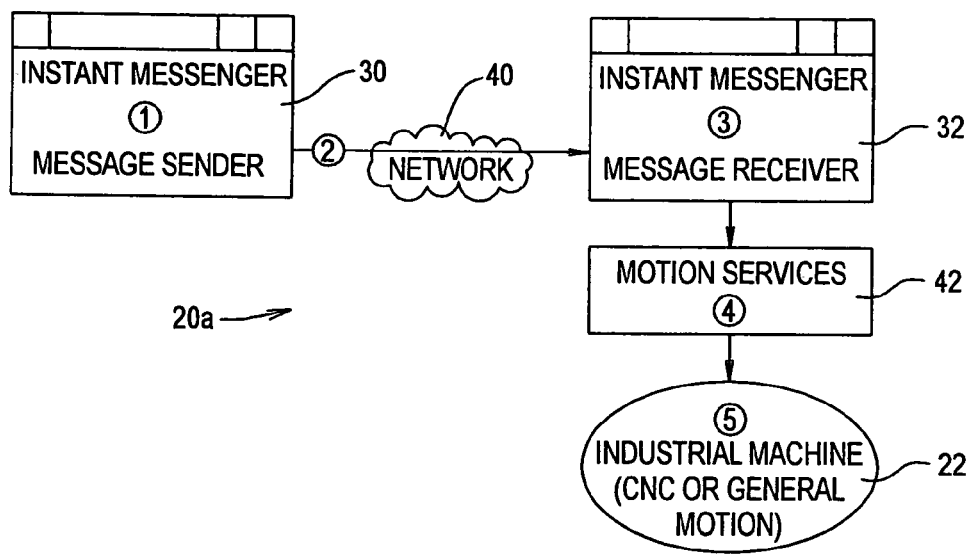
FIG. 1 is a scenario map depicting the interaction of the modules of a first embodiment of the present invention.

The present invention may be embodied in many different forms and variations. The following discussion is arranged in four sections each containing a description of a number of similar embodiments of the invention.

The reference characters used herein employ a number prefix and, some cases, a letter suffix. When used without a suffix in the following description or in the drawing, the reference character indicates a function that is implemented in all of the embodiments in association with which that number prefix is used. When appropriate, a suffix is used to indicate a minor variation associated with a particular embodiment, and this minor variation will be discussed in the text.

I. Instant Messenger to Industrial Machine

This section describes a system used for and method of communicating with an Instant Messenger device or software to control, configure and monitor the physical motions that occur on an industrial machine such as a CNC machine or a General Motion machine.

In the present application, the term Instant Messenger (IM) refers to technology that uses a combination of hardware and software to allow a first device, such as a handheld, cell phone, personal computer or other device, to instantly send messages to another such device. For example, Microsoft's Messenger Service allows one user to send a text message to another across a network, where the message is sent and received immediately, network latency notwithstanding. Typically, the messages are sent using plain text messages, but other message formats may be used.

This section describes the use of the instant messaging technology to activate, control, configure, and query motion operations on an industrial machine (ie CNC or General Motion machine). More specifically, this section contains a first sub-section that describes how the instant messenger technology is used to interact with an industrial machine and a second subsection that describes how human speech can be used to interact with an industrial machine.

Referring now generally to FIGS. 1–6, depicted by reference character 20a–f therein are a number of motion systems that use instant messaging technology to control the actions of an industrial machine 22. Instant message interactions are typically created on a first or instant message enabled device 30 (the message sender) and are transmitted to second or other instant message enabled device 32 (the message receiver 32). IM messages are transmitted between the message sender 30 and the message receiver 32 using a network 40. In addition, the exemplary systems 20 also comprise a motion services module 42.

Referring initially to the format of the messages transmitted between the sender 30 and receiver 32, the message data is typically stored and transferred in ASCII text format, but other formats may be employed as well. For example, the message data may be in a binary format (such as raw voice data) or a formatted text format (such as XML), or a custom mix of binary and text data.

In any format, an IM message sent as described herein will typically include instructions and/or parameters corresponding to a desired motion operation or sequence of desired motion operations to be performed by the industrial machine 22. The term "desired motion operation" will thus be used herein to refer to both a single motion operation or to a plurality of such motion operations that combine to form a sequence of desired motion operations.

In addition or instead, the message may include instructions and/or parameters that change the configuration of the industrial machine 22 and/or query the industrial machine 22 to determine a current state of the toy or a portion thereof.

The message sender 30 can be an instant message enabled device such as a personal computer, a cell phone, a hand-held computing device, or a specific custom device, such as a game controller, having instant message technology built in. The message sender 30 is configured to operate using an instant messaging communication protocol compatible with that used by the message receiver 32.

The message receiver 32 is typically an instant message enabled device such as a personal computer, cell phone, hand-held computing device, or even a specific custom device, such as a toy or fantasy device, having instant message technology built into it.

The network 40 may be any Local Area (LAN) or Wide Area (WAN) network; examples of communications networks appropriate for use as the network 40 include an Ethernet based TCP/IP network, a wireless network, a fiber optic network, the Internet, an intranet, a custom proprietary network, or a combination of these networks. The network 40 may also be formed by a BlueTooth network or may be a direct connection such as an Infra-Red connection, Firewire connection, USB connection, RS232 connection, parallel connection, or the like.

The motion services module 42 maps the message to motion commands corresponding to the desired motion operation. To perform this function, the motion services module 42 may incorporate several different technologies.

First, the motion services module 42 preferably includes an event services module such as is described in U.S. patent application Ser. No. 10/074,577 filed on Feb. 11, 2002, and claiming priority of U.S. Provisional Application Ser. No. 60/267,645, filed on Feb. 9, 2001. The contents of the '577 application are incorporated herein by reference. The event services module described in the '577 application allows instructions and data contained in a message received by the message receiver 32 to be mapped to a set of motion commands appropriate for controlling the industrial machine 22.

Second, the motion services module 42 may be constructed to include a hardware-independent system for generating motion commands such as is as described in U.S. Pat. No. 5,691,897. A hardware independent motion services module can generate motion commands appropriate for a particular industrial machine 22 based on remote events generate without knowledge of the particular industrial machine 22. However, other technologies that support a single target machine 22 in a hardware dependent manner may be used to the implement the motion services module 42.

A. Instant Message Interactions

Referring now to FIGS. 1–6 of the drawing, depicted therein are several exemplary motion systems constructed in accordance with, and embodying, the principles of the present invention.

1. IM to IM to Motion to Industrial Machine

Referring now to FIG. 1, depicted therein is a first exemplary motion system 20a of the present invention. The motion system 20a operates in a peer-to-peer manner; that is, the message sender 30 sends an instant message to the message receiver 32, which in turn uses the motion services module 42 to determine what (if any) motions to carry out on the target toy 32.

More specifically, a message is first entered into the IM message sender 30. Once the message is entered, the message sender 30 sends the message across the network 40 to the message receiver 32. After receiving the message, the IM message receiver 32 uses the motion services module 42 to determine what (if any) motions are to be run.

The motion services module 42 next directs the industrial machine 22 to run the set of motion commands. Typically, the set of motion commands sent by the motion services module 42 to the industrial machine 22 causes the industrial machine 22 to perform the desired motion operation or sequence of operations.

Further, as described above the motion commands generated by the motion services module may also change configuration settings of the industrial machine 22, or data stored at the industrial machine 22 may be queried to determine the current state of the industrial machine 22 or a portion thereof. If the motion commands query the industrial machine 22 for data indicative of status, the data is typically sent back to the message sender 30 through the motion services module 42, message receiver 32, and network 40.

2. IM to IM/Motion to Industrial Machine

Figure 2:
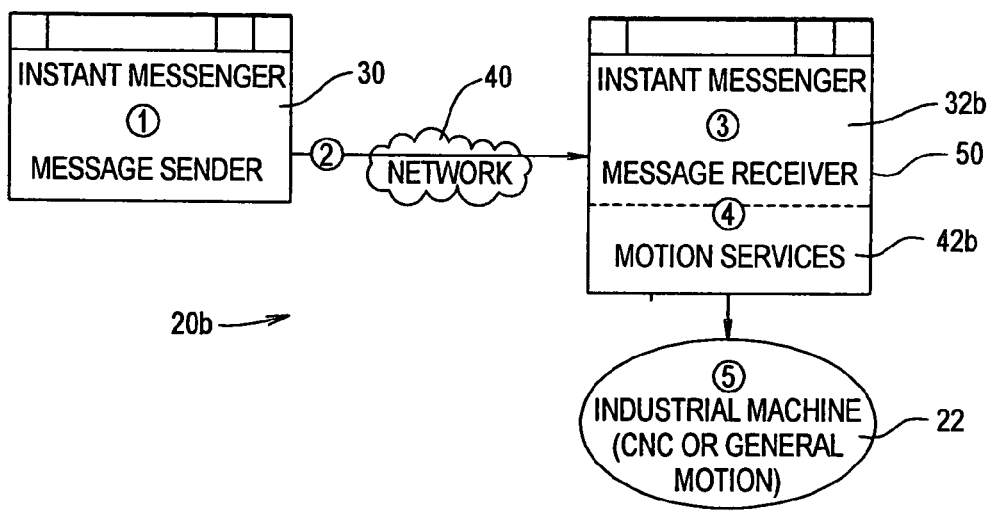
FIG. 2 is a scenario map depicting the interaction of the modules of a second embodiment of the present invention.

Referring now to FIG. 2, depicted therein is a second motion system 20b of the present invention. The motion system 20b is similar to the motion system 20a described above. The primary difference between the systems 20a and 20b is that, in the system 20b, the functions of the motion services module 42b are built into the IM message receiver 32b. The combined message receiver 32b and motion services module 42b will be referred to as the receiver/motion module and identified by reference character 50.

The second motion system 20b operates basically as follows. First, a message is entered into the IM message sender 30. Once the message is entered, the message sender 30 sends the message across the network 40 to the message receiver 32b.

After receiving the message, the IM message receiver 32b uses the built-in motion services module 42b to determine what (if any) motions are to be run. The built-in motion services module 42b maps the message to the appropriate desired motion operation that is to take place on the industrial machine 22.

The motion services module 42b then directs the industrial machine 22 to run the motion commands associated with the desired motion operation. The industrial machine 22 then runs the motion commands, which allows the industrial machine 22 to "come to life" and perform the desired motion operation. In addition, configuration settings may be changed on the industrial machine 22 or data may be queried to determine the current state of the industrial machine 22 or a portion therein.

3. IM to IM to Industrial Machine

Figure 3:
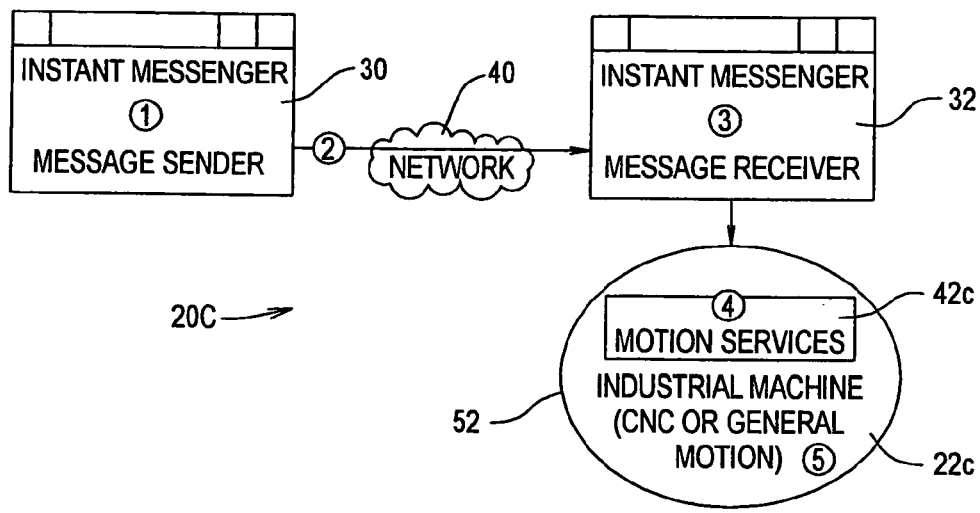
FIG. 3 is a scenario map depicting the interaction of the modules of a third embodiment of the present invention.

Referring now to FIG. 3, depicted therein is a third motion system 20c of the present invention. The motion system 20c is similar to the motion systems 20a and 20b described above. However, in the motion system 20c the motion services module 42c is built directly into the industrial machine 22c. The message receiver 32 receives messages and simply reflects or redirects them to the industrial machine 22c.

The industrial machine 22c, using the built-in motion services module 42c, directly processes and runs any messages that contain motion related instructions or messages that are associated with motions that the industrial machine 22c will later perform. The combination of the industrial machine 22c and the motion services module 42c will be referred to as a toy/motion module; the toy/motion module is identified by reference character 52 in FIG. 3.

In the system 20c, the following steps are performed. First, the message is entered in the IM message sender 30. Once the message is entered, the message sender 30 next sends the message across the network 40 to the message receiver 32.

After receiving the message, the IM message receiver 32 simply reflects or re-directs the message directly to the industrial machine 22c without processing the message. The communication between the IM message receiver 32 and the industrial machine 22c may occur over a network, a wireless link, a direct connection (i.e. Infra-red link, serial link, parallel link, or custom wiring), or even through sound where the industrial machine 22c recognizes the sound and translates the sound message.

Upon receiving the request, the industrial machine 22c first directs the message to the motion services module 42c, which in-turn attempts to map the message to the appropriate motion commands to the desired motion operation that is to be performed by the industrial machine 22c. The motion services module 42c then directs the industrial machine 22c to run motion commands, causing the industrial machine 22c to "come to life" and perform the desired motion operation.

Although the motion services module 42c is a part of the industrial machine 22c, the motion services module 42c need not be organized as a specific subsystem within the industrial machine 22c. Instead, the motion services module 42c may be integrally performed by the collection of software, firmware, and/or hardware used to cause the industrial machine 22c to move in a controlled manner. In addition, as described above, the control commands may simply change configuration settings on the industrial machine 22c or query data stored by the industrial machine 22c to determine the current state of the industrial machine 22c or a portion thereof.

4. IM to Industrial Machine—First Embodiment

Figure 4:
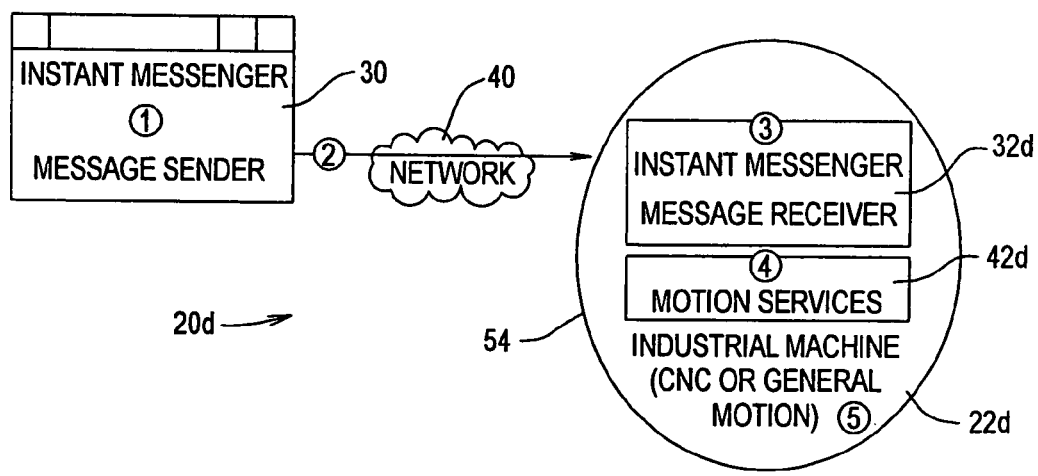
FIG. 4 is a scenario map depicting the interaction of the modules of a fourth embodiment of the present invention.

Referring now to FIG. 4, depicted therein is a fourth motion system 20d of the present invention. The motion system 20d is similar to the motion systems 20a, 20b, and 20c described above but comprises an advanced industrial machine 22d that directly supports an instant messenger communication protocol (i.e. a peer-to-peer communication).

In the motion system 20d, the IM message receiver 32d and the motion services module 42d are built directly into the industrial machine 22d. The industrial machine 22d, using the built-in message receiver 32d and motion services module 42d, directly receives, processes, and runs any messages that contain motion related instructions or messages that are associated with motions that the industrial machine 22d will later perform. The combination of the industrial machine 22d, the message receiver 32d, and the motion services module 42c will be referred to as the enhanced industrial machine module; the enhanced industrial machine module is identified by reference character 54 in FIG. 4.

In the motion system 20d, the following steps take place. First the message is entered into the IM message sender 30. Once the message is entered, the message sender 30 sends the message across the network 40 to the message receiver 32d. The communication to the industrial machine 22d may occur over any network, a wireless link, a direct connection (i.e. Infra-red link, serial link, parallel link, or custom wiring), or even through sound where the industrial machine 22 recognizes the sound and translates the sound message.

When receiving the message, the industrial machine 22d uses its internal instant message technology (i.e. software, firmware or hardware used to interpret instant messenger protocol) to interpret the message. In particular, the industrial machine 22d first uses the motion services module 42d to attempt to map the message to the appropriate motion command corresponding to the desired motion operation that is to be performed by the industrial machine 22d.

The motion services module 42 then directs the industrial machine 22d to run the motion command or commands, causing the industrial machine 22d to "come to life" and perform the desired motion operation.

The motion services module 42d is a part of the industrial machine 22d but need not be organized as a specific subsystem of the industrial machine 22d. Instead, the functions of the motion services module 42d may be performed by the collection of software, firmware and/or hardware used to run the motion commands (either pre-programmed or downloaded) on the industrial machine 22d. In addition, the control commands may change configuration settings on the industrial machine 22d or query data to determine the current state of the industrial machine 22d or a portion therein.

5. IM to Industrial Machine—Second Embodiment

Figure 5:
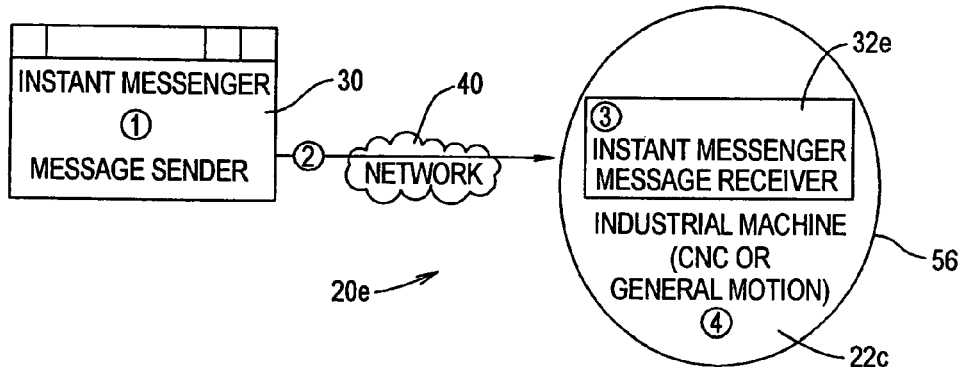
FIG. 5 is a scenario map depicting the interaction of the modules of a fifth embodiment of the present invention.

Referring now to FIG. 5, depicted therein is a fifth motion system 20e of the present invention. The motion system 20e is similar to the motion systems 20a, 20b, 20c, and 20d described above; however, in the motion system 20e the industrial machine 22e comprises instant message technology that causes the industrial machine 22e to perform non-motion functions. For example, instant message technology may be used to send messages to the industrial machine 22e that cause the industrial machine 22e to carry out other actions such as turning on/off a digital or analog input or output that causes a light to flash on the industrial machine 22 or a sound (or sounds) to be emitted by the industrial machine 22.

The motion system 20e thus comprises an advanced industrial machine 22e that directly supports an instant messenger communication protocol (i.e. a peer-to-peer communication). The motion system 20e contains a built-in IM message receiver 32e and does not include a motion services module. The industrial machine 22e, using the built-in message receiver 32e directly receives, processes, and responds to any messages that contain instructions or messages that are associated with non-motion actions to be performed by the industrial machine 22e. The combination of the industrial machine 22e and the message receiver 32e will be referred to as the non-motion industrial machine module; the non-motion industrial machine module is identified by reference character 56 in FIG. 4.

The motion system 20e performs the following steps. First, the message is entered into the IM message sender 30. Once the message is entered, the message sender 30 sends the message across the network 40 to the message receiver 32e. Again, the communication between message sender 30 and the industrial machine 22e may occur over any network, a wireless link, a direct connection (i.e. Infra-red link, serial link, parallel link, or custom wiring), or even through sound where the industrial machine 22e recognizes the sound and translates the sound message.

Upon receiving the message, the industrial machine 22e uses its internal instant message technology (i.e. software, firmware or hardware used to interpret instant messenger protocol) to interpret the message. Depending on the message contents, the industrial machine 22e performs some action such as turning on/off a digital or analog input or output or emitting a sounds or sounds. In addition, the configuration settings may be changed on the industrial machine 22e and/or data stored by the industrial machine 22e may be queried to determine the current state of the industrial machine 22e or a portion thereof.

6. IM to Server to IM to Industrial Machine

Figure 6:
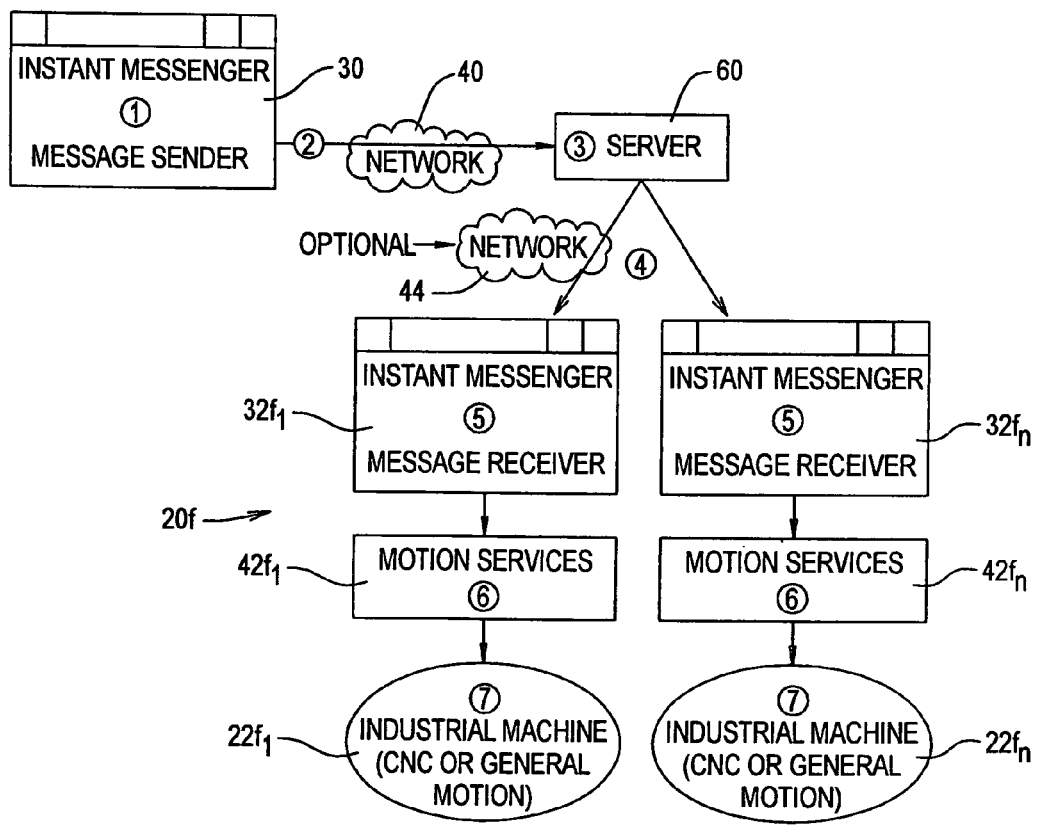
FIG. 6 is a scenario map depicting the interaction of the modules of a sixth embodiment of the present invention.

Depicted at 20f in FIG. 6 is yet another motion system of the present invention. The motion system 20f is similar to the motion systems 20a, 20b, 20c, 20d, and 20e described above; however, the motion system 20f comprises an IM message sender 30, a first network 40, an optional second network 44, and a server 60. The exemplary motion system 20f further comprises a plurality of toys $22f_{1-n}$, a plurality of message receivers $32f_{1-n}$, and a plurality of motion services modules $42f_{1-n}$, where one of the receivers 32f and motion services modules 42f is associated with each of the toys 22f.

The first network 40 is connected to allow at least instant message communication between the IM message sender 30 and the server 60. The optional second network 44 is connected to allow data to be transferred between the server 60 and each of the plurality of receivers 32f.

The second network 44 may be an Ethernet TCP/IP network, the Internet, a wireless network, or a BlueTooth network or may be a direct connection such as an Infra-Red connection, Firewire connection, USB connection, RS232 connection, parallel connections, or the like. The second network 44 is optional in the sense that the receivers 32f may be connected to the server 60 through one or both of the first and second networks 40 and 44. In use, the message sender 30 sends a message to the server 60 which in turn routes or broadcasts the message to one or more of the IM message receivers 32f.

As shown in FIG. 6, the system 20f works in the following manner. First, a message is entered at the IM message sender 30. Once the message has been entered, the message sender 30 sends the message across the first network 40 to the server 60. The server 60 then routes or broadcasts the message to one or more of message receivers 32f.

After receiving the message, the server 60 routes or broadcasts the message to one or more instant messenger receivers 32f over the second network 44 if used. Upon receiving the request, each of the IM message receivers 32f uses the motion services module 42f associated therewith to determine how or whether the motion commands are to run on the associated industrial machine 22f.

The motion services modules 42f map the message to the motion commands required to cause the industrial machine 22f to perform the desired motion operation or sequence of operations. In addition, the motion commands may change the configuration settings on the industrial machine 22f or query data stored by the industrial machine 22f to determine the current state of the industrial machine 22f or a portion thereof.

The topologies of the second through fourth motion systems 20b, 20c, and 20d described above may applied to the motion system 20f. In particular, the server 20f may be configured to operate in a system in which: (a) the motion services module 42f is built in to the message receiver 32f; (b) the motion services module 42f is built in to the industrial machine 22f, and the receiving messenger simply redirects the message to the industrial machine 22f; (c) the message receiver 32f is built in to the industrial machine 22f; (d) one or both of the message receiver 32f and motion services module 42f are built into the server 60; or (e) any combination of these topologies.

B. Speech Interactions

Referring now to FIGS. 7–10, depicted therein are a number of motion systems 120 in which human speech is used as a remote event that invokes actions on an industrial machine 122 using instant messenger technology as a conduit for the message. A number of possible implementations of the use of human speech as a remote event to cause motion will be discussed in the following subsections.

The motion systems 120 each comprise a person 124 as a source of spoken words, a speech-to-text converter (speech converter) 126, an IM message sender 130, an IM message receiver 132, a network 140, and a motion services module 142.

The message sender 130 and receiver 132 have capabilities similar to the message sender 30 and message receiver 32 described above. The IM message sender is preferably an instant message protocol generator formed by an instant messenger sender 30 or a hidden module that generates a text message based on the output of the speech converter 126 using the appropriate instant messenger protocol.

The network 140 and motion services module 142 are similar to the network 40 and motion services module 42 described above.

The speech converter 126 may be formed by any combination of hardware and software that allows speech sounds to be translated into a text message in one of the message formats described above. Speech converters of this type are conventional and will not be described herein in detail. One example of an appropriate speech converter is provided in the Microsoft Speech SDK 5.0 available from Microsoft Corporation.

1. Speech to IM to Motion to Industrial Machine

Figure 7:
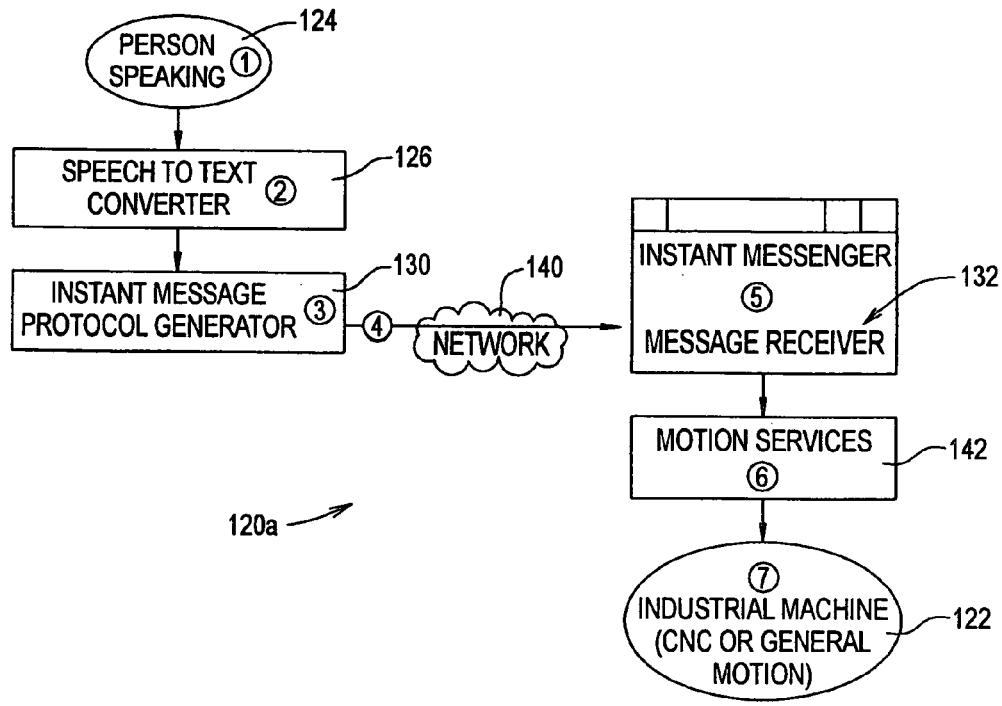
FIG. 7 is a scenario map depicting the interaction of the modules of a seventh embodiment of the present invention.

Referring now to FIG. 7, depicted therein is a motion system 120a of the present invention. The system 120a operates as follows.

First the person speaks a message. For example, the person may say 'move left'. The speech converter 126 converts the spoken message into a digital representation (i.e. ASCII text, XML or some binary format) and sends the digital representation to the instant messenger protocol generator functioning as the message sender 130.

Next, the instant messenger protocol generator 130 takes the basic text message and converts it into instant messenger message using the appropriate protocol. The message is sent by the instant messenger protocol generator 130 across the network 140.

After receiving the message, the IM message receiver 132, uses the motion services module 142 to determine what (if any) motions are to be run. Upon receiving the request, the motion services module 142 maps the message to the appropriate motion command corresponding to the motion operation corresponding to the words spoken by the person 124. The motion services module 142 then directs the industrial machine 122 to run a selected motion operation or set of operations such that the industrial machine 122 "comes to life" and runs the desired motion operation (i.e., turn left). In addition, the motion commands may change the configuration settings on the industrial machine 122 or query data to determine the current state of the industrial machine 122 or a portion thereof.

2. Speech to IM to Industrial Machine—First Embodiment

Figure 8:
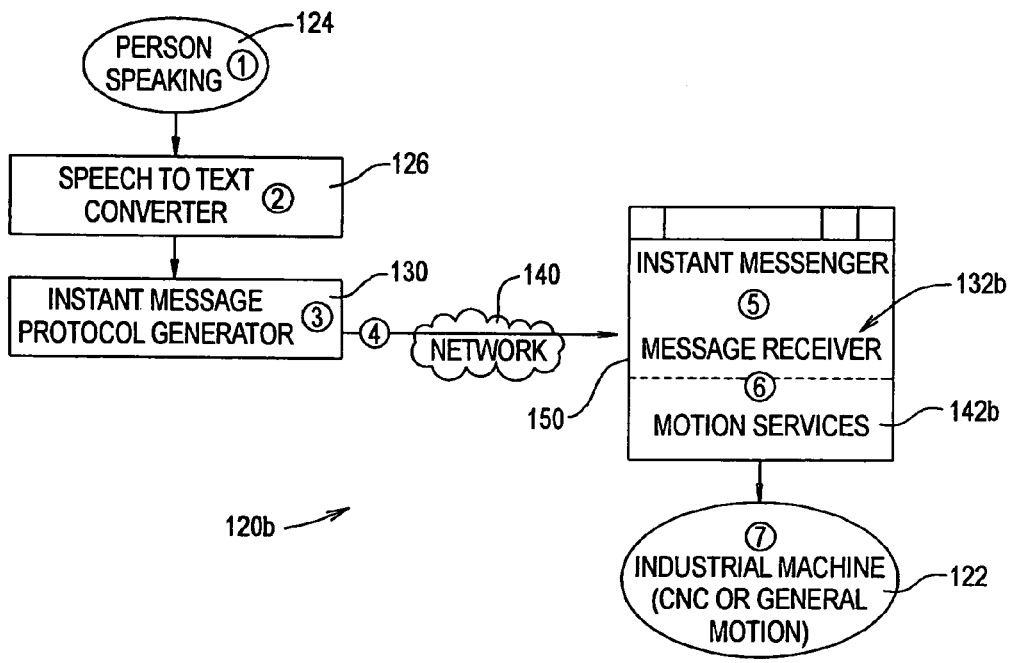
FIG. 8 is a scenario map depicting the interaction of the modules of an eighth embodiment of the present invention.

Depicted in FIG. 8 is another embodiment of a motion system 120b that allows a speech-generated message to be sent to an IM message receiver 132b. The motion system 120b is similar to the motion system 120a described above. The primary difference between the systems 120a and 120b is that, in the system 120b, the functions of the motion services module 142b are built into the IM message receiver 132b. The combined message receiver 132b and motion services module 142b will be referred to as the receiver/motion module and is identified in the drawing by reference character 150.

The following steps take place when the motion system 120b operates.

First the person 124 speaks a message. For example, the person 124 may say 'move left'. The speech-to-text converter 126 converts the spoken message into a digital representation of the spoken words and sends this digital representation to the instant messenger protocol generator 130.

Next, the instant messenger protocol generator 130 takes the basic text message and converts it into an IM message using the appropriate IM protocol. The message is sent by the instant messenger protocol generator 130 across the network 140 to the IM message receiver 132b.

After receiving the message, the IM message receiver 132b uses the built in motion services module 142b to determine what (if any) motion commands are to be run. The built-in motion services module 142b maps the message to the motion commands corresponding to the desired motion operation. The motion services module 142b then directs the industrial machine 122 to run the motion commands such that the industrial machine 122 comes to life and runs the desired motion operation (i.e., turn left). In addition, the motion commands may change the configuration settings on the industrial machine 122 or query data to determine the current state of the industrial machine 122 or a portion thereof.

3. Speech to IM to Industrial Machine—Second Embodiment

Figure 9:
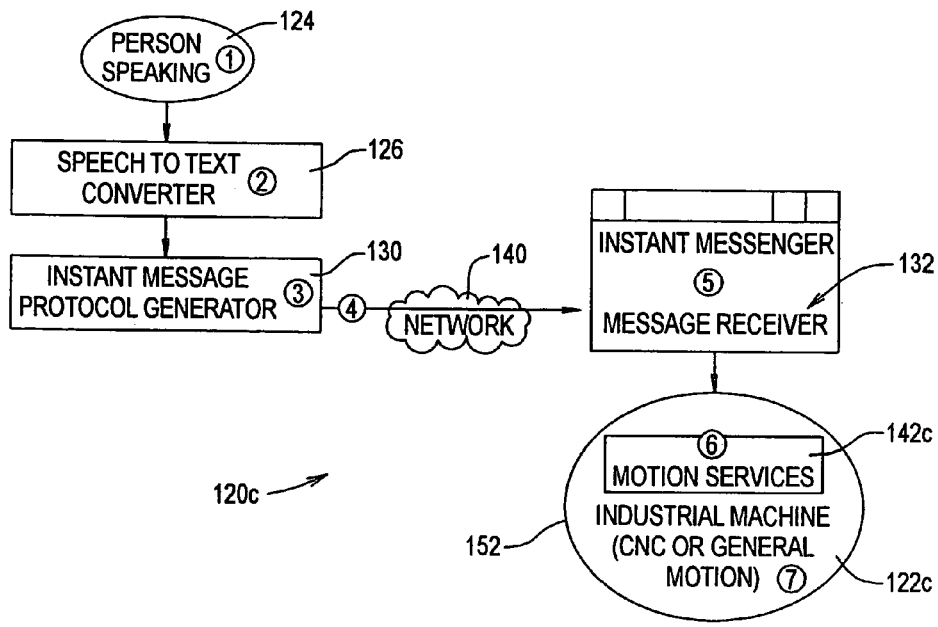
FIG. 9 is a scenario map depicting the interaction of the modules of a ninth embodiment of the present invention.

Depicted in FIG. 9 is another embodiment of a motion system 120c that allows a speech-generated message to be sent to a industrial machine 122c. The motion system 120c is similar to the motion systems 120a and 120b described above. The primary difference between the system 120c and the systems 120a and 120b is that, in the system 120c, the functions of the motion services module 142c are built into the industrial machine 122c. The combination of the industrial machine 122c and the motion services module 142c will be referred to as the receiver/motion module and identified by reference character 152.

As shown in FIG. 9, the following steps take place when the motion system 120c operates. First, the person 124 speaks a message. For example, the person 124 may say 'move left'. The speech-to-text converter 126 converts the spoken message into a digital representation (i.e. ASCII text, XML or some binary format) and sends the digital representation to the message sender or instant messenger protocol generator 130.

Next, the instant messenger protocol generator 130 takes the basic text message and converts it into a message format defined by the appropriate instant messenger protocol. The message is then sent by instant messenger protocol generator across the network 140.

After receiving the message, the IM message receiver 132 reflects or re-directs the message to the industrial machine 122c without processing the message. The communication to the industrial machine 122c may occur over a network, a wireless link, a direct connection (i.e. Infra-red link, serial link, parallel link, or custom wiring), or even through sound where the industrial machine 122c recognizes the sound and translates the sound message.

Upon receiving the request, the industrial machine 122c first directs the message to the motion services module 142c, which in-turn attempts to map the message to the appropriate motion command corresponding to the desired motion operation to be performed by the industrial machine 122c. The motion services module 142c direct the industrial machine 122c to run the motion commands such that the industrial machine 122c "comes to life" and performs the desired motion operation (i.e., turns left).

The motion services module 142c are a part of the industrial machine 122c but need not be organized as a specific subsystem in the industrial machine 122c. Instead, the functions of motion services module may be implemented by the collection of software, firmware, and/or hardware used to cause the industrial machine 122c to move. In addition, the motion commands may change the configuration settings on the industrial machine 122c or query data stored on the industrial machine 122c to determine the current state of the industrial machine 122c or a portion thereof.

4. Speech to Industrial Machine

Figure 10:
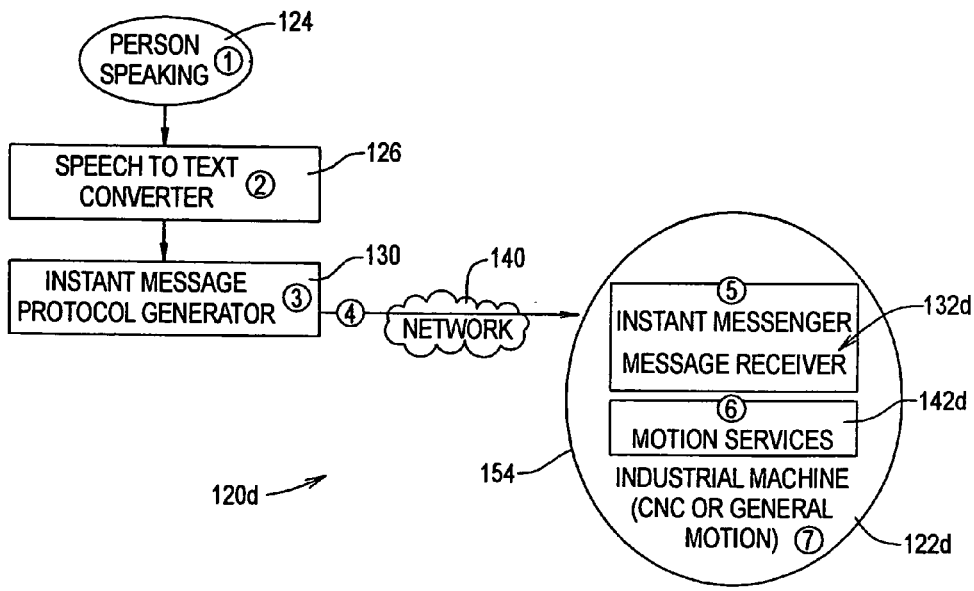
FIG. 10 is a scenario map depicting the interaction of the modules of a tenth embodiment of the present invention.

Depicted in FIG. 10 is another embodiment of a motion system 120d that allows a speech-generated message to be sent to a industrial machine 122d. The motion system 120d is similar to the motion systems 120a, 120b, and 120c described above. The primary difference between the system 120d and the systems 120a, 120b, and 120c is that, in the system 120d, the functions of both the message receiver 132d and the motion services module 142d are built into the industrial machine 122d. The combination of the industrial machine 122d and the motion services module 142d will be referred to as an enhanced industrial machine module and be identified by reference character 154.

In the motion system 120d, the following steps take place. First, the person 124 speaks a message. For example, the person may say 'move left'. The speech-to-text converter 126 converts the spoken message into a digital representation (i.e. ASCII text, XML or some binary format) and sends the digital representation to the message sender or instant messenger protocol generator 130.

Next, the instant messenger protocol generator 130 takes the basic text message and converts it into the message format defined by the appropriate IM protocol. The message is then sent by the instant messenger protocol generator 130 across the network 140 to the enhanced industrial machine module 154.

Upon receiving the message, the industrial machine 122d uses the internal message receiver 132d to interpret the message. The industrial machine 122d next uses the motion services module 142d to attempt to map the message to the motion commands associated with the desired motion operation as embodied by the IM message.

The motion services module 142d then directs the industrial machine 122d to run the motion commands generated by the motion services module 142d such that the industrial machine 122d "comes to life" and performs the desired motion operation.

The motion services module 142d is a part of the industrial machine 122d but may or may not be organized as a specific subsystem of the industrial machine 122d. The collection of software, firmware, and/or hardware used to run the motion commands (either pre-programmed, or downloaded) on the industrial machine 122d may also be configured to perform the functions of the motion services module 142d. In addition, the motion commands may change the configuration settings on the industrial machine 122d or query data to determine the current state of the industrial machine 122d or a portion thereof.

II. Gaming and Animation Event Driven Motion

This sub-section describes a number of motion systems 220 that employ an event system to drive physical motions based on events that occur in a number of non-motion systems. One such non-motion system is a gaming system such as a Nintendo or Xbox game. Another non-motion system that may be used by the motion systems 120 is a common animation system (such as a Shockwave animation) or movie system (analog or digital).

All of the motion systems 220 described below comprise a motion enabled device 222, an event source 230, and a motion services module 242. In the motion systems 220 described below, the motion enabled device 222 is typically a toy or other fantasy device, a consumer device, a full sized mechanical machine, or other consumer device that is capable of converting motion commands into movement.

The event source 230 differs somewhat in each of the motion systems 220, and the particulars of the different event sources 230 will be described in further detail below.

The motion services module 242 is or may be similar to the motion service modules 42 and 142 described above. In particular, the motion services module 242 maps remotely generated events to motion commands corresponding to the desired motion operation. To perform this function, the motion services module 242 may incorporate an event services module such as is described in U.S. patent application Ser. No. 10/074,577 cited above. The event services module described in the '577 application allows instructions and data contained in an event to be mapped to a set of motion commands appropriate for controlling the motion enabled device 222.

This section comprises two sub-sections. The first sub-section describes four exemplary motion systems 220a, 220b, 220c, and 220d that employ an event source 230 such as common video game or computer game to drive physical motions on a motion enabled device 222. The second sub-section describes two exemplary motion systems 220e and 220f that employ an event source such as an animation, video, or movie to drive physical motions on a motion enabled device 222.

A. Game Driven Motion

Computer and video games conventionally maintain a set of states that manage how characters, objects, and the game 'world' interact with one another. For example, in a role-playing game the main character may maintain state information such as health, strength, weapons, etc. The car in a race-car game may maintain state information such as amount of gasoline, engine temperature, travel speed, etc. In addition, some games maintain an overall world state that describes the overall environment of the game.

The term "events" will be used in this sub-section to refer user or computer similar actions that affect the states maintained by the game. More specifically, all of the states maintained by the game are affected by events that occur within the game either through the actions of the user (the player) or that occur through the computer simulation provided by the game itself. For example, the game may simulate the movements of a character or the decline of a character's health after a certain amount of time passes without eating food. Alternatively, the player may trigger events through their game play. For example, controlling a character to fire a gun or perform another action would be considered an event.

When events such as these occur, it is possible to capture the event and then trigger an associated physical motion (or motions) to occur on a physical device associated with the game. For example, when a character wins a fight in the computer game, an associated 'celebration dance' event may fire triggering a physical toy to perform a set of motions that cause it to sing and dance around physically.

Each event may be fired manually or automatically. When using manual events, the game environment itself (i.e. the game software, firmware or hardware) manually fires the events by calling the event manager software, firmware, or hardware. Automatic events occur when an event manager is used to detect certain events and, when detected, run associated motion operations.

The following sections describe each of these event management systems and how they are used to drive physical motion.

1. Manual Events

Figure 11:
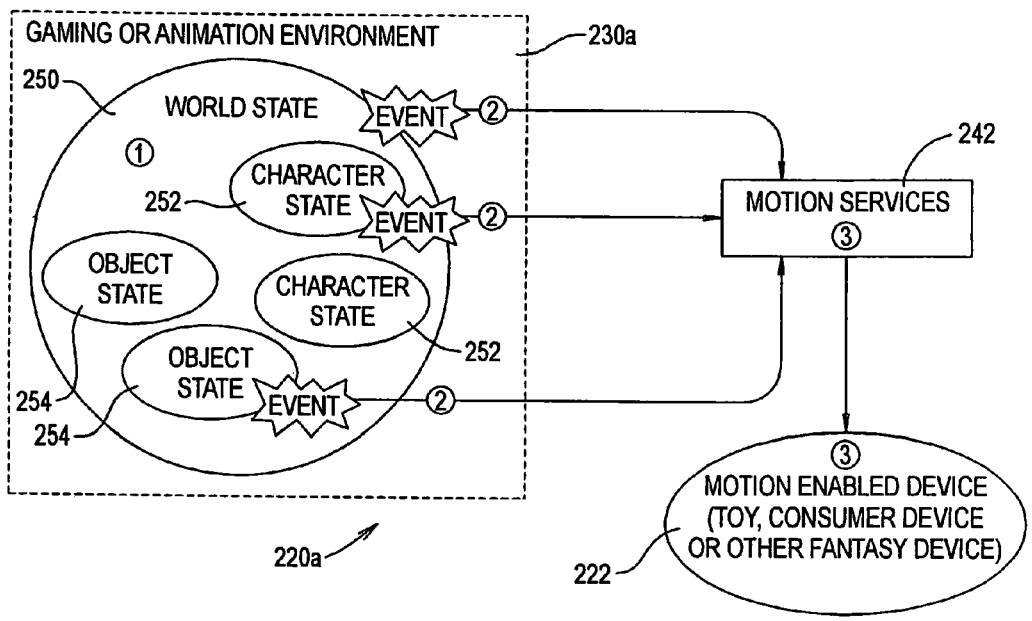
FIG. 11 is a scenario map depicting the interaction of the modules of an eleventh embodiment of the present invention.

Referring initially to FIG. 11, depicted therein is a motion system 220a comprising an event source 230a, a motion services module 242, and a motion enabled device 222. The exemplary event source 230a is a gaming system comprising a combination of software, firmware, and/or hardware. As is conventional, the event source 230a defines a plurality of "states", including one or more world states 250, one or more character states 252, and one or more object states 254.

Each of the exemplary states 250, 252, and 254 is programmed to generate or "fire" what will be referred to herein as "manual" motion services events when predetermined state changes occur. For example, one of the character states 252 includes a numerically defined energy level, and the character state 252 is configured to fire a predetermined motion services event when the energy level falls below a predetermined level. The motion services event so generated is sent to the motion services module 242, which in turn maps the motion services event to motion commands that cause a physical replication of the character to look tired.

The following steps typically occur when such manual events are fired during the playing of a game.

First, as the gaming system 230a is played the gaming system 230a continually monitors its internal states, such as the world states 250, character states 252, and/or object states 254 described above.

When the gaming system 230a detects that parameters defined by the states 250–254 enter predetermined 'zones', motion services events associated with these states and zones are fired.

For example, one of the character states 252 may define one or a character's health on a scale of 1 to 10, with 10 indicating optimal health. A 'low-health' zone may be defined as when the energy level associated with the character state 252 is between 1 and 3. When the system 230a, or more specifically the character state 252, detects that the character's health is within the 'low-health' zone, the 'low-health' motion services event is fired to the motion services module 242.

As an alternative to firing an event, the gaming system 230a may be programmed to call the motion services module 242 and direct it to run the program or motion operation associated with the detected state zone.

After the event is filed or the motion services module 242 is programmatically called, the motion services module 242 directs the motion enabled device 222 to carry out the desired motion operation.

2. Automatic Events—First Embodiment

Figure 12:
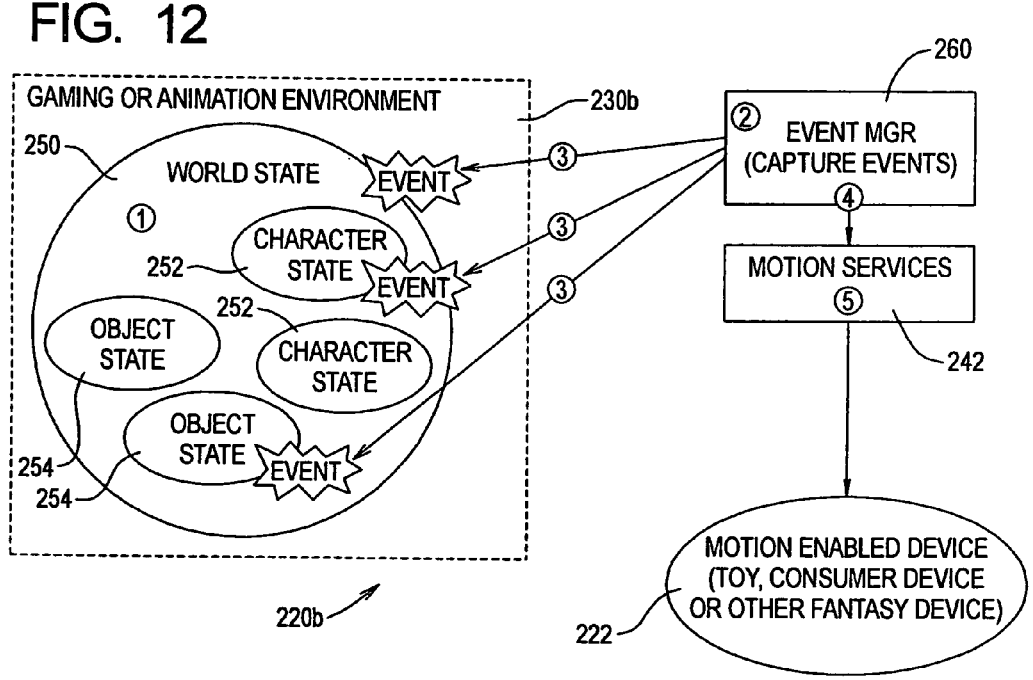
FIG. 12 is a scenario map depicting the interaction of the modules of a twelfth embodiment of the present invention.

Referring now to FIG. 12, depicted therein is a motion system 220b comprising an event source or gaming system 230b, a motion services module 242, a motion enabled device 222, and an event manager 260.

The exemplary event source 230b is similar to the event source 230a and defines a plurality of "states", including one or more world states 250, one or more character states 252, and one or more object states 254. However, the event source 230b is not programmed to generate or "fire" the motion services events. Instead, the event manager 260 monitors the gaming system 230b for the occurrence of predetermined state changes or state zones. The use of a separate event manager 260 allows the system 220b to operate without modification to the gaming system 230b.

When the event manager 260 detects the occurrence of such state changes or state zones, the event manager 260 sends a motion services event message to the motion services module 242. The motion services module 242 in turn sends appropriate motion commands to the motion enabled device 222 to cause the device 222 to perform the desired motion sequence.

The following steps occur when automatic events are used. First, the world states 250, character states 252, and object states 254 of the gaming system 230b continually change as the system 230b operates.

The event manager 260 is configured to monitor the gaming system 230b and detect the occurrence of predetermined events such as a state changes or a state moving into a state zone within the game environment. The event manager 260 may be constructed as described in U.S. Patent Application Ser. No. 60/267,645 cited above.

When such an event is detected, the event manager 260 prepares to run motion operations and/or programs associated with those events. In particular, when the event manager 260 detects one of the predetermined events, the event manager 260 sends a motion services message to the motion services module 242. The motion services module 242 then causes the motion enabled device 222 to run the desired motion operation associated with the detected event.

3. Automatic Events—Second Embodiment

Figure 13:
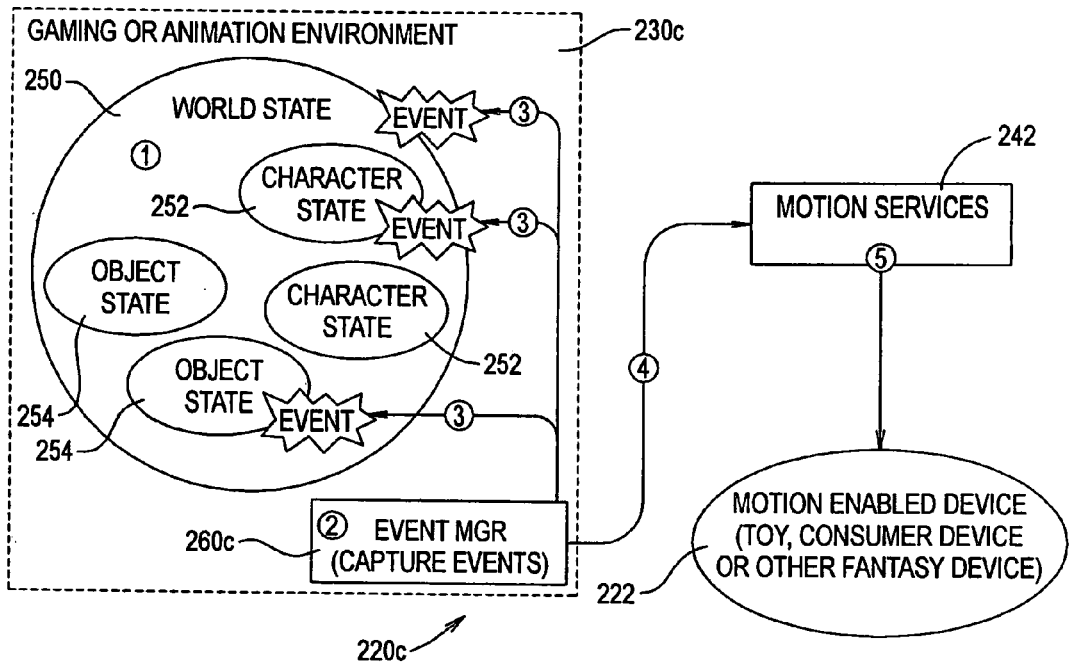
FIG. 13 is a scenario map depicting the interaction of the modules of a thirteenth embodiment of the present invention.

Referring now to FIG. 13, depicted therein is a motion system 220c comprising an event source or gaming system 230c, a motion services module 242, a motion enabled device 222, and an event manager 260c.

The exemplary event source 230c is similar to the event source 230a and defines a plurality of "states", including one or more world states 250, one or more character states 252, and one or more object states 254.

While the event source 230c itself is not programmed to generate or "fire" the motion services events, the event manager 260c is built-in to the event source 230c. The built-in event manager 260c monitors the gaming system 230c for the occurrence of predetermined state changes or state zones. The built-in event manager 260c allows the system 220c to operate without substantial modification to the gaming system 230c.

When the event manager 260c detects the occurrence of such state changes or state zones, the event manager 260c sends a motion services event message to the motion services module 242. The motion services module 242 in turn sends appropriate motion commands to the motion enabled device 222 to cause the device 222 to perform the desired motion sequence.

The following steps occur when automatic events are used. First, the world states 250, character states 252, and object states 254 of the gaming system 230c continually change as the system 230c operates.

The event manager 260c is configured to monitor the gaming system 230c and detect the occurrence of predetermined events such as a state changes or a state moving into a state zone within the game environment.

When such an event is detected, the event manager 260c prepares to run motion operations and/or programs associated with those events. In particular, when the event manager 260c detects one of the predetermined events, the event manager 260 sends a motion services message or event to the motion services module 242. The motion services module 242 then causes the motion enabled device 222 to run the desired motion operation associated with the detected event.

B. Animation Driven Motion

The term "animation" is used herein to refer to a sequence of discrete images that are displayed sequentially. An animation is represented by a digital or analog data stream that is converted into the discrete images at a predetermined rate. The data stream is typically converted to visual images using a display system comprising a combination of software, firmware, and/or hardware. The display system forms the event source 230 for the motion systems shown in FIGS. 14–16.

Animation events may be used to cause a target motion enabled device 222 to perform a desired motion operation. In a first scenario, an animation motion event may be formed by a special marking or code in the stream of data associated with a particular animation. For example, a digital movie may comprise one or more data items or triggers embedded at one or more points within the movie data stream. When the predetermined data item or trigger is detected, an animation motion event is triggered that causes physical motion on an associated physical device.

In a second scenario, a programmed animation (e.g., Flash or Shockwave) may itself be programmed to fire an event at certain times within the animation. For example, as a cartoon character bends over to pick-up something, the programmed animation may fire a 'bend-over' event that causes a physical toy to move in a manner that imitates the cartoon character.

Animations can be used to cause motion using both manual and automatic events as described below.

1. Manual Events

Figure 14:
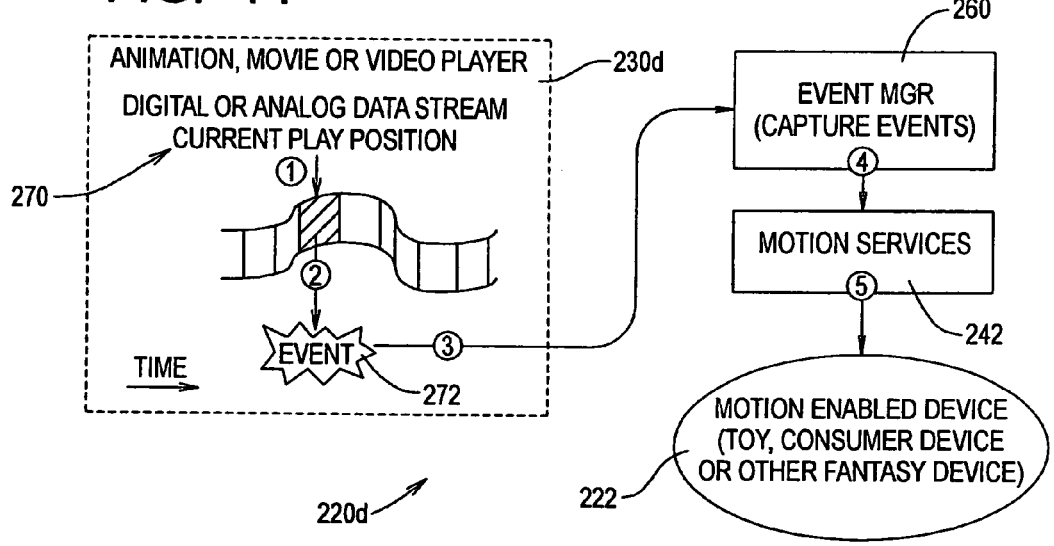
FIG. 14 is a scenario map depicting the interaction of the modules of a fourteenth embodiment of the present invention.

Referring now to FIG. 14, depicted therein is a motion system 220d comprising an event source or display system 230d, a motion services module 242, a motion enabled device 222, and an event manager 260.

To support a manual event, the display system 230d used to play the data must be configured to detect an animation event by detecting a predetermined data element in the data stream associated with the animation. For example, on an analog 8-mm film a special 'registration' hash mark may be used to trigger the event. In a digital animation, the animation software may be programmed to fire an event associated with motion or a special data element may be embedded into the digital data to the later fire the event when detected. The predetermined data element corresponds to a predetermined animation event and thus to a desired motion operation to be performed by the target device 222.

The following steps describe how an animation system generates a manual event to cause physical motion.

First the animation display system 230d displays a data stream 270 on a computer, video screen, movie screen, or the like. When external event manager 260 detects the event data or programmed event, the event manager 260 generates an animation motion message. In the case of a digital movie, the event data or programmed event will typically be a special digital code or marker in the data stream. In the case of an analog film, the event data or programmed event will typically be a hash mark or other visible indicator.

The external event manager 260 then sends the animation motion message to the motion services module 242. The motion services module 242 maps the motion message to motion commands for causing the target device 222 to run the desired motion operation. The motion services module 242 sends these motion commands to the target device 222. The motion services module 242 controls the target device to run, thereby performing the desired motion operation associated with the detected animation event.

In particular, the motion services module 242 generates motion commands and sends these commands to the target device 222. The motion services module 242 controls the target device to run, thereby performing the desired motion operation associated with the animation event 272.

2. Automatic Events

Figure 15:
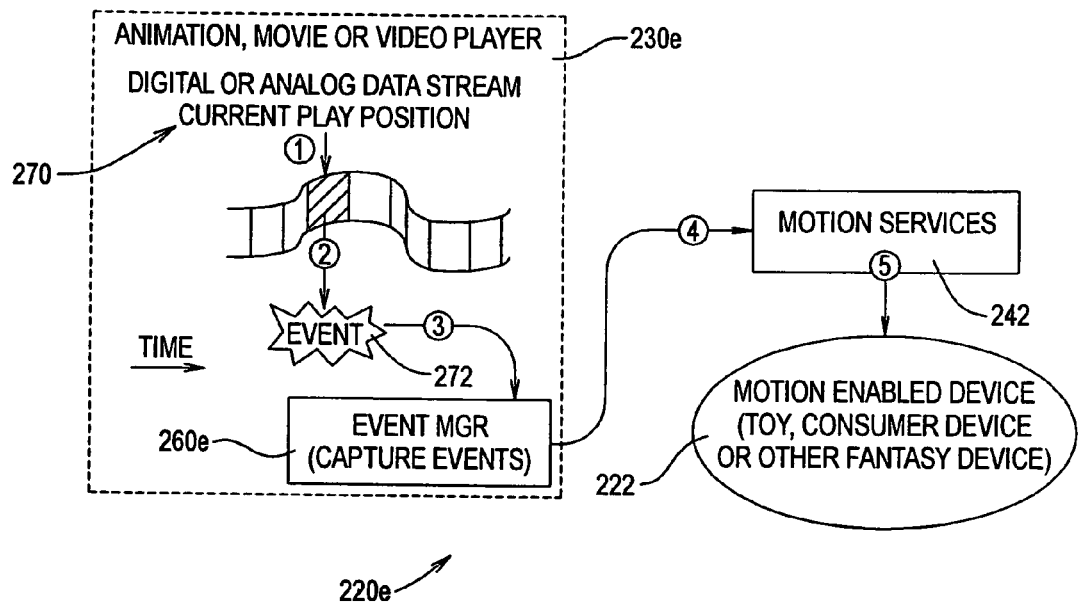
FIG. 15 is a scenario map depicting the interaction of the modules of a fifteenth embodiment of the present invention.

Referring now to FIG. 15, depicted therein is a motion system 220e comprising an event source or display system 230d, a motion services module 242, a motion enabled device 222, and an event manager 260e. In the motion system 220e, the event manager 260e is built into the display system 230e such that the system 230e automatically generates the animation events.

The following steps describe how an animation generates automatic animation events to cause physical motion.

First, the animation display system 230e displays a data stream 270 on a computer, video screen, movie screen, or the like. When built-in event manager 260e detects the animation event by analyzing the data stream 270 for predetermined event data or programmed event, the event manager 260e generates the animation event 272.

The internal event manager 260 then sends an appropriate motion message to the motion services module 242. The motion services module maps the motion message to motion commands for causing the target device 222 to run the desired motion operation. The motion services module 242 sends these motion commands to the target device 222. The motion services module 242 controls the target device to run, thereby performing the desired motion operation associated with the animation event 272.

III. Music Driven Motion

Numerous media players are available on the market for playing pre-recorded or broadcast music. Depicted at 320 in FIGS. 16–19 of the drawing are motion systems capable of translating sound waves generated by such medial player systems into motion. In particular, the motion systems 320 described herein comprise a motion enabled device or machine 322, a media player 330, a motion services module 342, and a music-to-motion engine 350.

The motion-enabled device 322 may be a toy, a consumer device, a full sized machine for simulating movement of an animal or human or other machine capable of controlled movement.

The media player 330 forms an event source for playing music. The media player 330 typically reproduces music from an analog or digital data source conforming to an existing recording standard such as a music MP3, a compact disk, movie media, or other media that produced a soundwave. The music may be derived from other sources such as a live performance or broadcast.

The music-to-motion engine 350 maps sound elements that occur when the player 330 plays the music to motion messages corresponding to desired motion operations. The music-to-motion engine 350 is used in conjunction with a media player such as the Microsoft® Media Player 7. The music-to-motion engine 350 sends the motion messages to the motion services module 342.

The motion services module 342 in turn maps the motion messages to motion commands. The motion services module 342 may be similar to the motion services modules 42, 142, and 242 described above. The motion commands control the motion-enabled device 322 to perform the motion operation associated with the motion message generated by the music-to-motion machine 350.

A. Module Layout

The music driven motion system 320 may be embodied in several forms as set forth below.

1. Music to Motion

Figure 16:
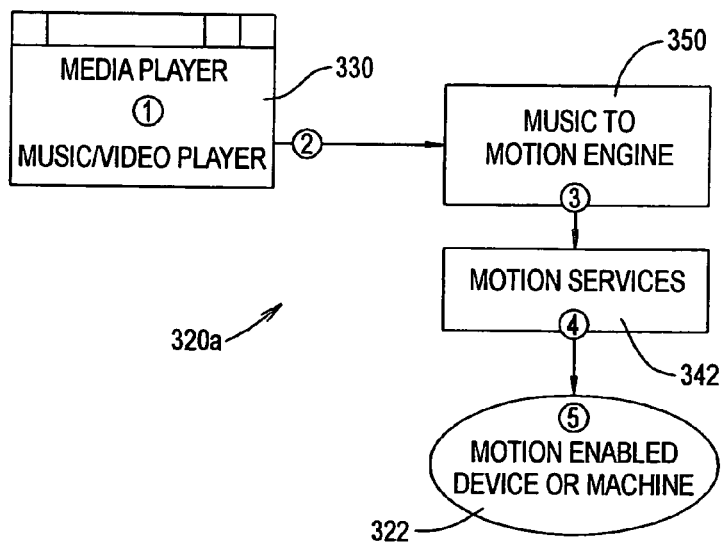
FIG. 16 is a scenario map depicting the interaction of the modules of a sixteenth embodiment of the present invention.

Referring now to FIG. 16, depicted therein is one exemplary embodiment of a music-driven motion system 320a of the present invention. The system 320a comprises a motion enabled device or machine 322, a media player 330, a motion services module 342, and a music-to-motion engine 350.

When using the system 320a to cause physical motion, the following steps occur. First the media player 330 plays the media that produces the sound and sends the sound wave to the music-to-motion engine 350. As will be described in further detail below, the music-to-motion engine 350 converts sound waves in electronic or audible form to motion messages corresponding to motion operations and/or programs that are to be run on the target device 322.

The music-to-motion engine 350 sends the motion messages to the motion services module 342. The motion services module 342 translates or maps the motion messages into motion commands appropriate for controlling the motion enabled device 322. The motion services module 342 sends the motion commands to the target device 322 and causes the device 322 to run the motion commands and thereby perform the desired motion operation.

2. Built-In Motion to Music

Figure 17:
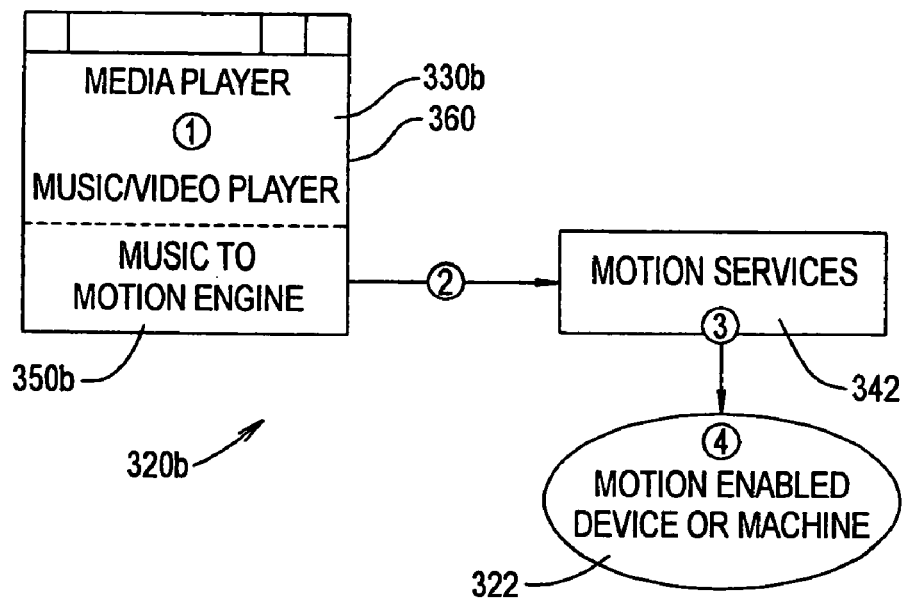
FIG. 17 is a scenario map depicting the interaction of the modules of a seventeenth embodiment of the present invention.

Referring now to FIG. 17, depicted therein is another exemplary embodiment of a music-driven motion system 320b of the present invention. The system 320b comprises a motion enabled device or machine 322, a media player 330b, a motion services module 342, and a music-to-motion engine 350b. The exemplary media player 330b and music-to-motion engine 350b are combined in a player/motion unit 360 such that the music-to-motion engine functions are built in to the player/motion unit 360.

When using the system 320b to cause physical motion, the following steps occur. First the media player 330b plays the media that produces the sound and sends the sound wave to the music-to-motion engine 350. The music-to-motion engine 350 converts the sound-wave to motion messages corresponding to motion operations and/or programs that are to be run on the target device.

The music-to-motion engine 350 sends the motion messages to the motion services module 342. The motion services module 342 translates or maps the motion messages into motion commands appropriate for controlling the motion enabled device 322. The motion services module 342 sends the motion commands to the target device 322 and causes the device 322 to run the motion commands and thereby perform the desired motion operation.

B. Music-To-Motion General Algorithm

This chapter describes the general algorithms used by the music-to-motion engine 350 to map sound-waves to physical motions.

1. Configuration

Before the systems 320a or 320b are used, the music-to-motion engine 350 is configured to map certain sounds or combinations of sounds or sound frequencies occur to desired motion operations. The exemplary music-to-motion engine 350 may be configured to map a set of motion operations (and the axes on which the operations will be performed) to predetermined frequency zones in the sound wave. For example, the low frequency sounds may be mapped to an up/down motion operation on both first and second axes which corresponds to the left and right arm on a toy device. In addition or instead, the high frequency sounds be mapped to a certain motion program, where the motion program is only triggered to run when the frequency zone reaches a certain predetermined level.

Figure 18:
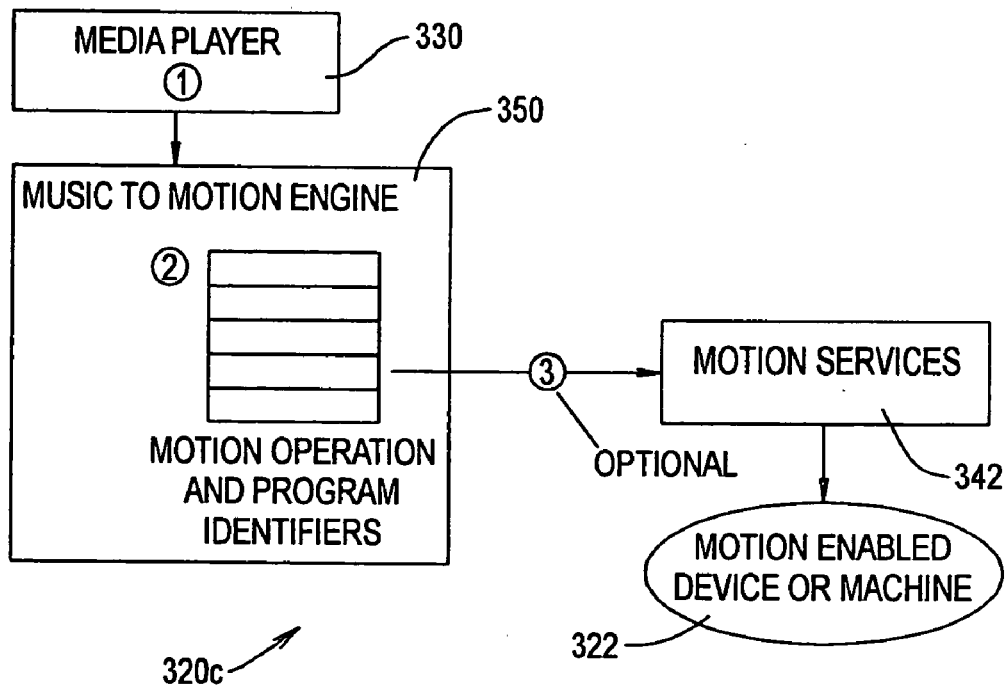
FIG. 18 is a scenario map illustrating details of operation of a music-to-motion engine used by the motion system of FIG. 17.

Referring now to FIG. 18, graphically depicted at 320c therein are the steps of one of exemplary method of configuring the systems 320a and 320b. In particular, the media player 330 and/or the music-to-motion engine 350 itself opens up a user interface or supplies initialization data used to configure the music-to-motion engine 350.

In the exemplary system 320c, the frequency ranges are mapped to motion operations. The frequency ranges may also be mapped to non-motion related operations such as turning on/off digital or analog input/output lines. Optionally, the music-to-motion engine 350 may query the motion services module 342 for the motion operations and/or programs that are available for mapping.

2. Mapping Methods

The following types of mappings may be used when configuring the music-to-motion engine 350.

The first mapping method is frequency zone to motion operation. This method maps a frequency zone to a motion operation (or set of motion operations) and a set of axes. The current level of frequency is used to specify the intensity of the motion operation (i.e. the velocity or distance of a move) and the frequency rate of change (and change direction) are used to specify the direction of the move. For example, if the frequency level is high and moving higher, an associated axis of motion may be directed to move at a faster rate in the same direction that it is moving. If the frequency decreases below a certain threshold, the direction of the motor may change. Thresholds at the top and bottom of the frequency range may be used to change direction of the motor movement. For example, if the top frequency level threshold is hit, the motor direction would reverse. And again when the bottom frequency level was hit the direction would reverse again.

The second mapping technique is frequency zone to motion program. A motion program is a combination of discrete motion operations. As described above, the term "motion operation" is generally used herein for simplicity to include both discrete motion operations and sequences of motion operations that form a motion program.

When this second mapping technique is used, a frequency zone is mapped to a specific motion program. In addition, a frequency threshold may be used to determine when to run the program. For example, if the frequency in the zone rises above a threshold level, the program would be directed to run. Or if the threshold drops below a certain level, any program running would be directed to stop, etc.

Once configured, the music-to-motion engine 350 is ready to run.

3. Music to Motion

When running the music-to-motion engine 350, the engine 350 may be programmed to convert sound waves to motion operations by breaking the sound wave into a histogram that represents the frequency zones previously specified when configuring the system. The level of each bar in the histogram can be determined in several ways such as taking the average of all frequencies in the zone (or using the minimum frequency, the maximum, the median value, etc). Once the histogram is constructed, the frequency zones are compared against any thresholds previously set for each zone. The motions associated with each zone are triggered depending on how they were configured.

For example, if thresholds are used for the specific zone, and those threshold are passed, the motion is triggered (i.e.

the motion operation or program for the zone is run). Or if no threshold is used, any detected occurrence of sound of a particular frequency (including its rate of change and direction of change) may be used to trigger and/or change the motion operation.

Figure 19:
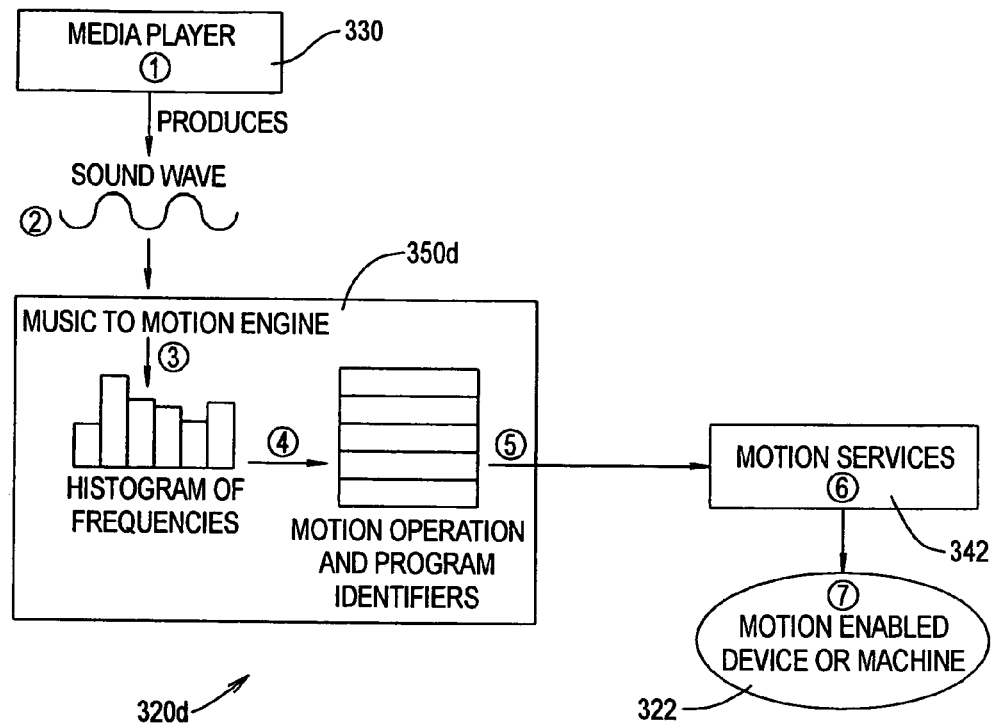
FIG. 19 is a scenario map illustrating details of operation of a music-to-motion engine used by the motion system of FIG. 17.

Referring now to FIG. 19, depicted therein is an exemplary motion system 320d using a music-to-motion engine 350d that generates a histogram of frequencies to map music events to motion. The following steps occur when running the exemplary music-to-motion engine 350d.

First the media player 330 plays the media and produces a sound-wave. The sound-wave produced is sent to the music-to-motion engine 350. The music-to-motion engine 350 then constructs a histogram for the sound wave, where the histogram is constructed to match the frequency zones previously specified when configuring the system.

Next, the music-to-motion engine 350 compares the levels of each bar in the histogram to the rules specified when configuring the system; as discussed above, these rules may include crossing certain thresholds in the frequency zone level etc. In addition, the rules may specify to run the motion operation at all times yet use the histogram bar level as a ratio to the speed for the axes associated with the frequency zone.

When a rule or set of rules are triggered for one or more frequency zones represented by the histogram, an associated lookup table of motion operations and/or programs is used to determine which of the group of available motion operations is the desired motion operation. Again, the term "motion operation" includes both discrete motion operations and sequences of motion operations combined into a motion program.

Next, a motion message corresponding to the desired motion operation is sent to the motion services module 342, which maps the motion message to motion commands as necessary to control the target device 322 to perform the desired motion operation.

The target motion enabled device 322 then runs the motion commands to perform desired motion operation and/or to perform related actions such as turning on/off digital or analog inputs or outputs.

IV. Motion Proximity Sensors

This document describes a system and/or method of using sensors or contact points to facilitate simple motion proximity sensors in a very low cost toy or other fantasy device. Typically within Industrial Applications very high priced, accurate sensors are used to control the homing position and the boundaries of motion taking place on an industrial machine. Because of the high prices (due to the high precision and robustness required by industrial machines) such sensors are not suitable for use on low-cost toys and/or fantasy devices.

A. Basic Movements

Toy and fantasy devices can use linear motion, rotational motion, or a combination of the two. Regardless of the type of motion used, quite often it is very useful to control the boundaries of motion available on each axis of motion. Doing so allows software and hardware motion control to perform more repeatable motions. Repeatable motions are important when causing a toy or fantasy device to run a set of motions over and over again.

1. Linear Motion

Linear motion takes place in a straight direction. Simple motion proximity sensors are used to bound the area of motion into what is called a motion envelope where the axis is able to move the end-piece left and right, up and down, or the like.

Figure 20:
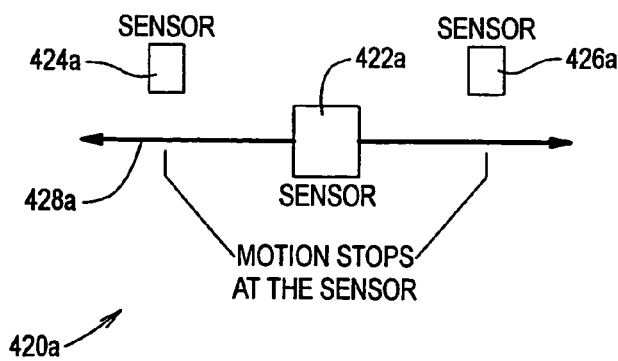
FIG. 20 is a schematic block diagram depicting the construction and operation of a first sensor system that may be used with the present invention.

Referring to FIG. 20, schematically depicted therein is a sensor system 420a comprising first, second, and third sensor parts 422a, 424a, and 426a. The first sensor part 422a is mounted on a moving object, while the second and third sensor parts 424a and 426a are end limit sensor parts that define the ends of a travel path 428a that in turn defines the motion envelope. The exemplary travel path 428a is a straight line.

The sensor parts 422, 424, and 426 may be implemented using any sensor type that signals that the moving part has hit (or is in the proximity of) one motion limit location or another. Examples of sensors that may be used as the sensors 422 include electrical contact sensors, light sensors, and magnetic sensors.

An electrical contact sensor generates a signal when the moving sensor part comes into contact with one of the fixed end limit sensor parts and closes an electrical circuit. The signal signifies the location of the moving part.

With a light sensor, the moving sensor part emits a beam of light. The end or motion limit sensor parts comprises light sensors that detect the beam of light emitted by the moving sensor part. Upon detecting the beam of light, the motion limit sensor sends a signal indicating that a change of state that signifies the location of the moving object on which the moving sensor part is mounted. The sensor parts may be reversed such that the motion limit sensor parts each emit a beam of light and the moving target sensor part is a reflective material used to bounce the light back to the motion limit sensor which then in-turn detects the reflection.

With a magnetic sensor, a magnet forms the moving sensor part on the moving object. The motion limit sensor parts detect the magnetic charge as the magnet moves over a metal (or magnetic) material. When detected, the motion limit sensor sends a signal indicative of the location of the moving object.

2. Rotational Moves

Rotational motion occurs when a motor moves in a rotating manner. For example, a rotational move may be used to move the arm or head on an action figure, or turn the wheel of a car, or swing the boom of a crane, etc.

Figure 21:
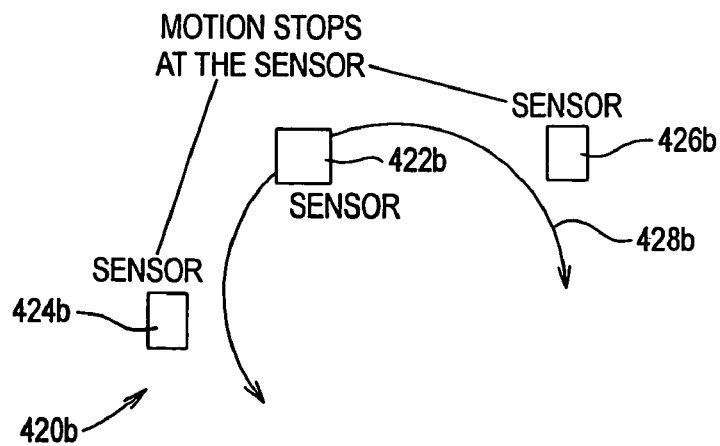
FIG. 21 is a schematic block diagram depicting the construction and operation of a second sensor system that may be used with the present invention.

Referring to FIG. 21, schematically depicted therein is a sensor system 420b comprising first, second, and third sensor parts 422b, 424b, and 426b. The first sensor part 422b is mounted on a moving object, while the second and third sensor parts 424b and 426b are end limit sensor parts that define the ends of a travel path 428b that in turn defines the motion envelope. The exemplary travel path 428b is a curved line.

The sensor parts 422, 424, and 426 may be implemented using any sensor type that signals that the moving part has hit (or is in the proximity of) one motion limit location or another. Examples of sensors that may be used as the sensors 422 include electrical contact sensors, light sensors, and magnetic sensors as described above.

B. Hard Wire Proximity Sensor

Motion limit sensors can be configured in many different ways. This sub-section describes a sensor system 430 that employs hard wired limit configurations using physical wires to complete an electrical circuit that indicates whether a physical motion limit is hit or not.

1. Simple Contact Limit

A simple contact limit configuration uses two sensors that may be as simple as two pieces of flat metal (or other conductive material). When the two materials touch, the electrical circuit is closed causing the signal that indicates the motion limit side is hit (or touched) by the moving part side.

Figure 22:
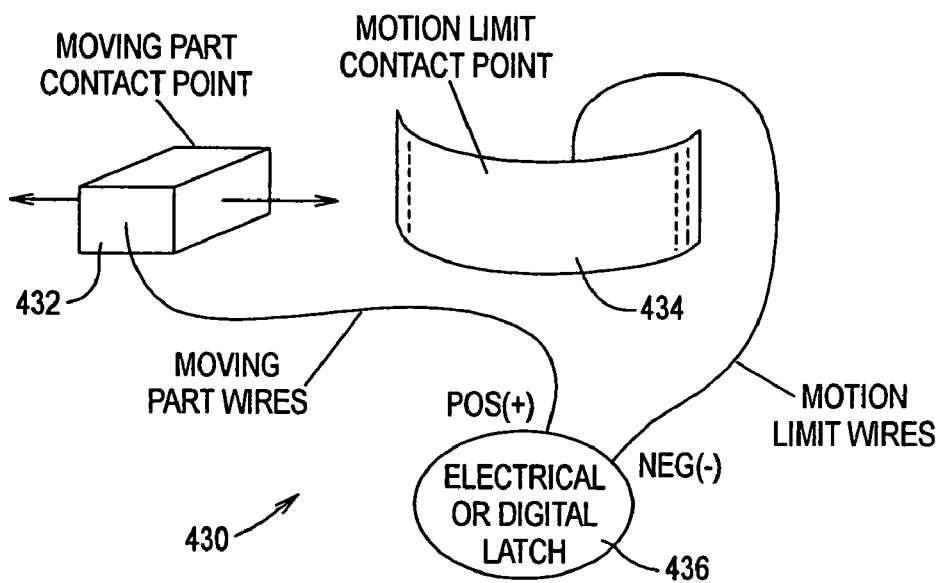
FIG. 22 is a schematic block diagram depicting the construction and operation of a third sensor system that may be used with the present invention.

Referring now to FIG. 22, depicted therein is an exemplary sensor system 430 using a simple contact limit system. The sensor system 430 employs a moving part contact point 432, a motion limit contact point 434, and an electronic or digital latch 436.

The moving part contact point 432 contains conductive material (for example a form of metal) that is connected to by moving part wires to the latch 436. The motion limit contact point 434 contains conductive material (for example a form of metal) that is also connected by motion limit wires to the latch 436.

The electrical or digital latch 436 stores the state of the electrical circuit. In particular, the electrical circuit is either closed or open, with the closed state indicating that the moving part contact point 432 and the motion limit contact point 434 are in physical contact. The latch 436 may be formed by any one of various existing latch technologies such as a D flip-flop, some other clock edge, one-shot latch, or a timer processor unit common in many Motorola chips capable of storing the state of the electrical circuit.

Figure 23:
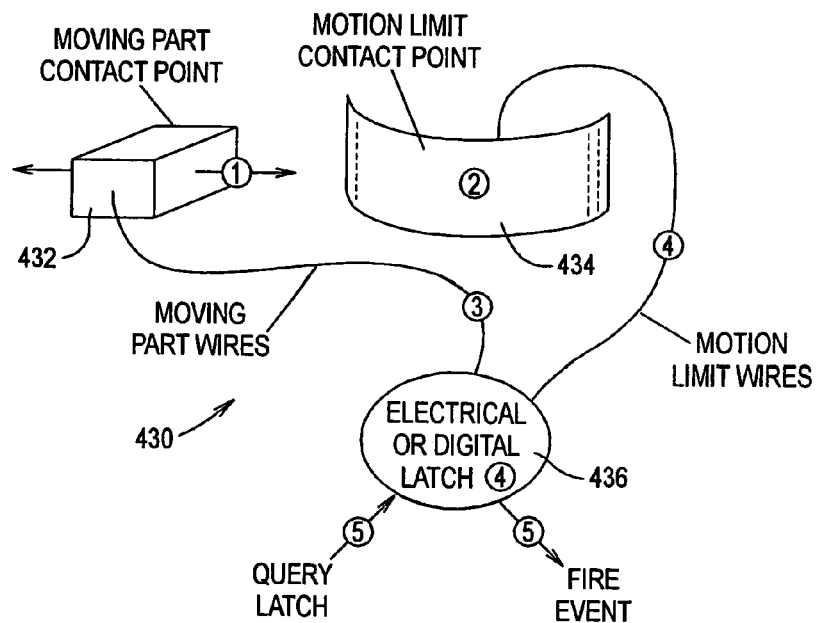
FIG. 23 is a scenario map depicting the operation of a sensor system of FIG. 22.

Referring now to FIG. 23, depicted therein is scenario map depicting how the system 430 operates. During use, the simple contact limit circuit is considered closed when the moving part contact point 432 touches the motion limit contact point 434. Upon contact, electricity travels between the contact points 432 and 434, thereby changing the electrical or digital latch 436 from an open to a closed state. The change of state of the latch 436 signifies that the limit is hit.

During operation of the system 430, the following steps occur. First, the moving object on which the contact point 432 is mounted must move toward the motion limit contact point 434. When these contact points 432 and 434 touch, an electrical circuit is formed, thereby allowing electricity to flow between the contact points 432 and 434. Electricity thus flows between the two contact points 432 and 434 to the electrical or digital latch 436 through the moving part and motion limit wires.

The electrical or digital latch 436 then detects the state change from the open state (where the two contact points are not touching) to the closed state (where the two contact points are touching). The latch stores this state.

At any time other hardware or software components may query the state of the electrical or digital latch to determine whether or not the motion limit has been hit or not. In addition a general purpose processor, special chip, special firmware, or software associated with the latch may optionally send an interrupt or other event when the latch is deemed as closed (i.e. signifying that the limit was hit). The motion limit sensor system 430 may thus form an event source of a motion system as generally described above.

A pair of such motion proximity sensor systems may be used to place boundaries around the movements of a certain axis of motion to create a motion envelope for the axis. In addition, a single proximity sensor may be used to specify a homing position used to initialize the axis by placing the axis at the known home location.

2. Dumb Moving Part Sensor Contact

Figure 24:
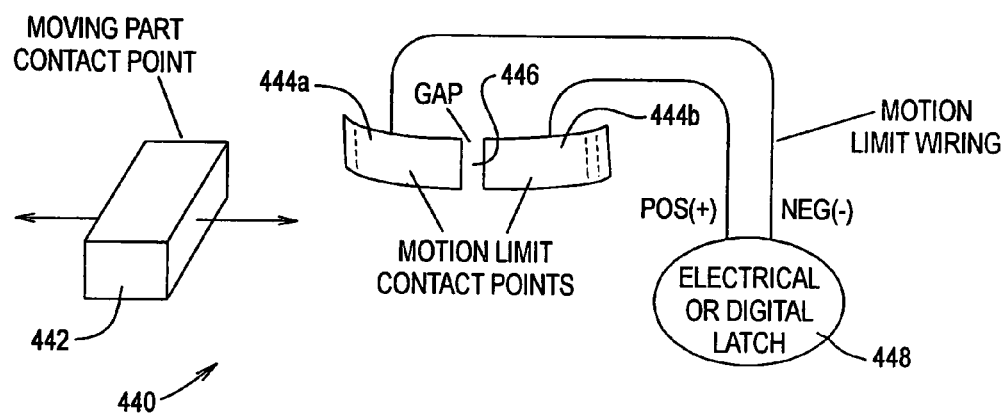
FIG. 24 is a schematic block diagram depicting the construction and operation of a fourth sensor system that may be used with the present invention.

Referring now to FIG. 24, depicted therein is another exemplary sensor circuit 440. The sensor circuit 440 comprises a moving contact point 442, first and second motion limit contact points 444a and 444b separated by a gap 446, and a latch 448. In the circuit 440, the positive and negative terminals of the latch 448 are connected to the motion limit contact points 444a and 444b. The sensor circuit 440 eliminates moving part wires to improve internal wiring and also potentially reduce costs. The moving part sensor system 440 thus acts as a dumb sensor requiring no direct wiring.

More specifically, the dumb moving part sensor contact point 442 is a simple piece of conductive material designed to close the gap 446 separating two contact points 444a and 444b. When closed, electrical current flows from one motion limit contact point 444a through the moving part contact point 442 to the other motion limit contact point 446, thus closing the electrical circuit and signaling that the motion limit has been reached.

The moving part contact point 442 is attached to or an integral part of the moving object. The moving part contact point 442 contains a conductive material that allows the flow of electricity between the two contact points 444a and 444b when the contact point 442 touches both of the contact points 444a and 444b.

The motion limit contact points 444a and 444b comprise two conductive members that are preferably separated by a non-conductive material defining the gap 446. Each contact point 444 is connected to a separate wire that is in turn connected one side of the electrical or digital latch 448.

The latch component 448 is used to store the state of the electrical circuit (i.e. either open or closed) and is thus similar to the latch component 436 described above. The latch 448 can thus be queried by other hardware or software components to determine whether or not the latch is open or closed. In addition, when coupled with additional electrical circuitry (or other processor, or other firmware, or other software) a detected closed state may trigger an interrupt or other event.

Figure 25:
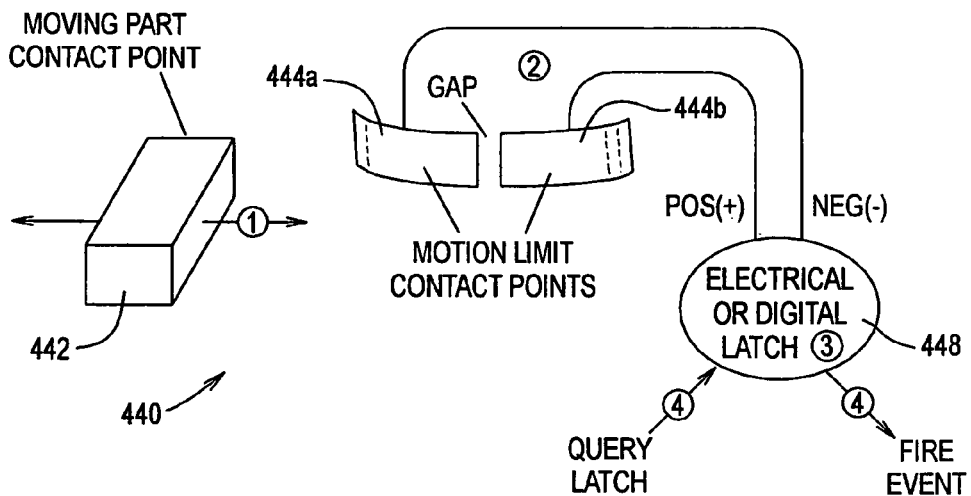
FIG. 25 is a scenario map depicting the operation of a sensor system of FIG. 24.

FIG. 25 depicts a scenario map depicting the use of the sensor system 440. In particular, the dumb moving part sensor circuit 440 operates as follows. First, the moving part contact point 442 must move towards the motion limit contact points 444a and 444b. Upon touching both of the motion limit contact points 444a and 444b, the moving part contact point 442 closes the electrical circuit thus creating a "limit hit" signal. The electrical or digital latch 448 retains the limit hit signal.

The open (or closed) state of the limit stored by the electrical or digital latch 448 can then be queried by an external source. Or, when coupled with more additional logic (hardware, firmware, and/or software) an interrupt or other event may be fired to an external source (either hardware, firmware or software) that the limit has been reached.

3. Light Sensors

In addition to using a physical contact to determine whether or not a moving part is within the proximity of a motion limit or not, a light beam and light detector may also be used to determine proximity.

Figure 26:
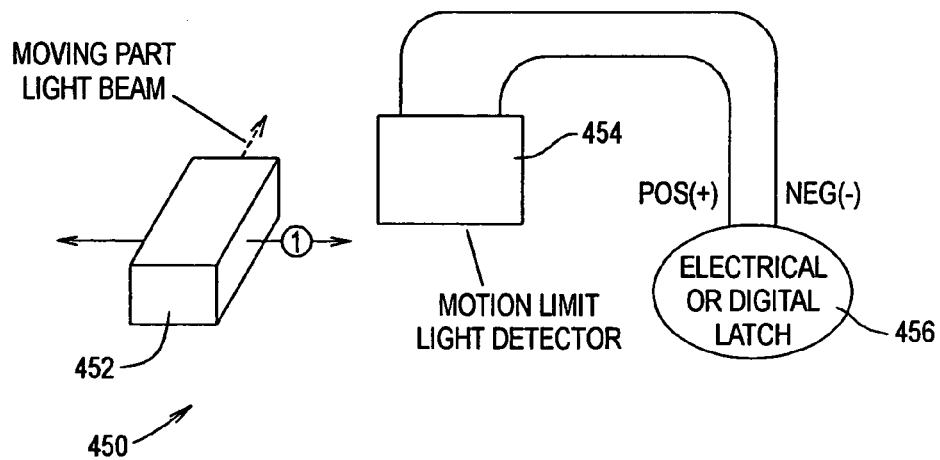
FIG. 26 is a schematic block diagram depicting the construction and operation of a fifth sensor system that may be used with the present invention.

Referring to FIG. 26, depicted at 450 therein is a light sensor circuit of the present invention. The light sensor circuit uses a moving part light beam device 452, a light detector 454, and a latch 456. The moving part light beam device 452 emits a beam of light. When the light detector 454 detects the light beam generated by the light beam device 452, the light detector 454 senses the light beam and closes the electrical circuit, thereby setting the latch 456.

The moving part light beam device 452 comprises any light beam source such as a simple LED, filament lamp, or other electrical component that emits a beam of light. The motion limit light detector 454 is a light sensor that, when hit with an appropriate beam of light, closes an electrical circuit. The electrical or digital latch 456 may be the same as the latches 436 and 448 described above.

Figure 27:
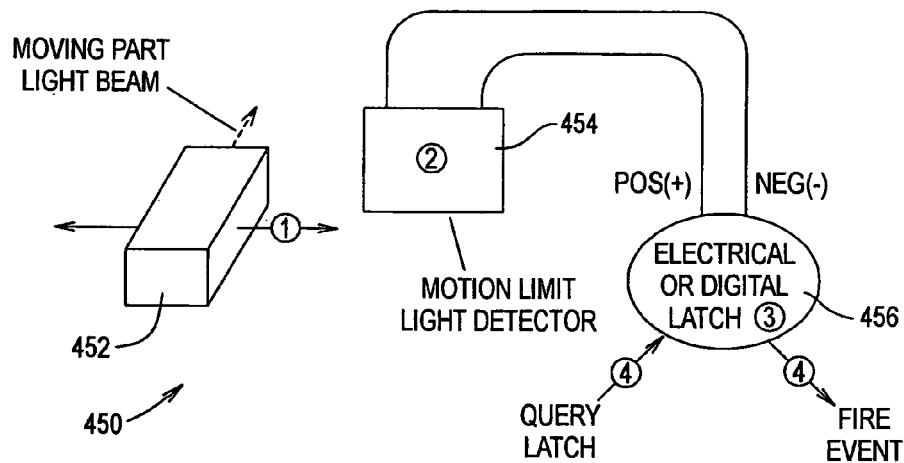
FIG. 27 is a scenario map depicting the operation of a sensor system of FIG. 26.

FIG. 27 illustrates the process of using the sensor circuit 450. First, the moving object to which the light beam device 452 is attached moves into a position where the light beam impinges upon the light detector 454. The light detector 454 then closes the electrical circuit.

When the state of the electrical circuit changes, the electrical or digital latch 456 stores the new state in a way that allows a motion system comprising hardware, firmware and/or software to query the state. At that point, motion system may query the state of the latch to determine whether or not the limit has been reached. In addition, additional logic (either implemented in hardware, software or firmware) may be used to fire an interrupt or other event when the circuit changes from the open to closed state and/or vise versa.

C. Wireless Proximity Sensor

In addition to the hard-wired proximity sensors, sensors may be configured to use wireless transceivers to transfer the state of the sensors to the latch hardware. The following sections describe a number of sensor systems that use wireless transceivers to transfer circuit state.

1. Wireless Detectors

Figure 28:
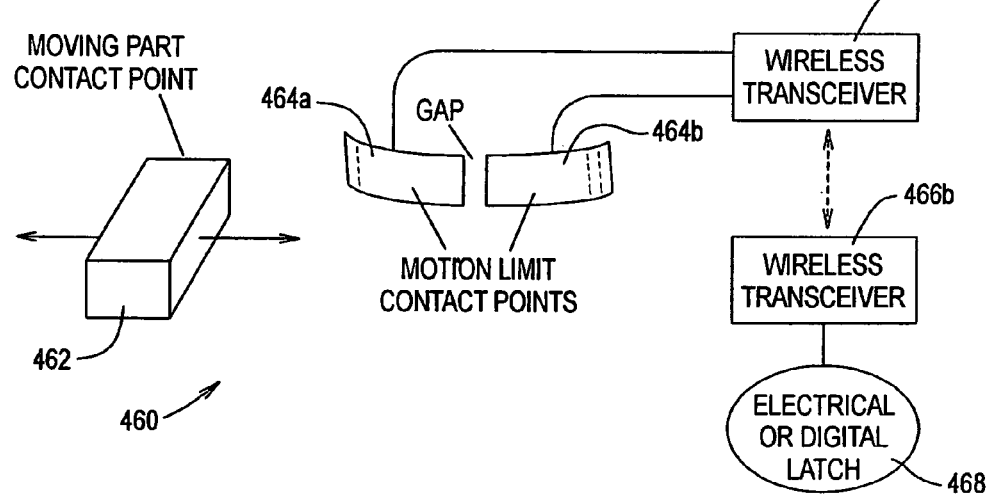
FIG. 28 is a schematic block diagram depicting the construction and operation of a sixth sensor system that may be used with the present invention.

Referring now to FIG. 28, depicted therein is a wireless sensor circuit 460. The sensor circuit 460 comprises a moving contact point 462 attached to the moving object, first and second motion limit contact points 464a and 464b, first and second wireless units 466a and 466b, and a latch component 468. The sensor circuit 460 uses the wireless units 466a and 466b to transfer the state of the circuit (and thus the contacts 464 and 466) to the latch component 468.

The moving part contact point 462 is fixed to or a part of the moving object. The moving part contact point 462 is at least partly made of a conductive material that allows the transfer of electricity between the two contact points 464a and 464b when the contact point 462 comes into contact with both of the contact points 464a and 464b.

The motion limit contact points 464a and 464b are similar to the contact points 444a and 444b described above and will not be described herein in further detail.

The wireless units 466a and 466b may be full duplex transceivers that allow bidirectional data flow between the contact points 464a and 464b and the latch 468. Optionally, the first wireless unit 466a may be a transmitter and the second unit 466b will be a receiver. In either case, the wireless units 466a and 466b are used to transfer data from the local limit circuit (which implicitly uses an electrical or digital latch) to the remote electrical or digital latch thus making the remote latch appear like it is actually the local latch.

The latch component 468 may be the same as the latches 436, 446, and 456 described above. Optionally, the latch component 468 may be built into the wireless unit 466b.

Figure 29:
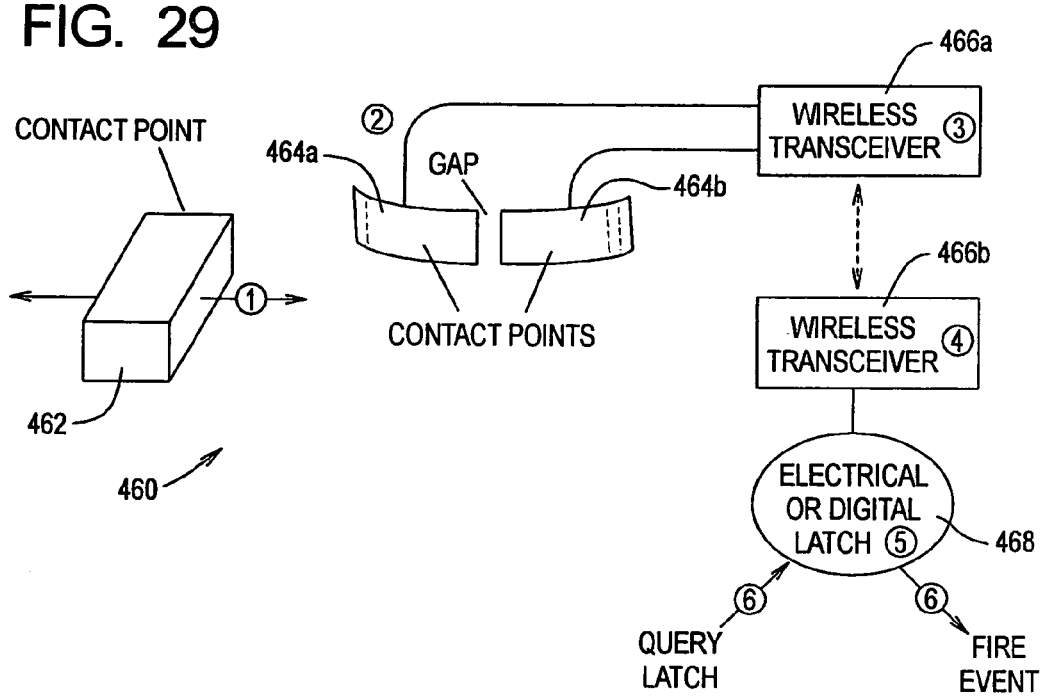
FIG. 29 is a scenario map depicting the operation of a sensor system of FIG. 28.

Referring now to FIG. 29, depicted therein is a scenario map depicting the operation of the sensor circuit 460. The sensor circuit 460 operate basically as follows. First, the moving part contact point 462 come into contact with both of the motion limit contact points 464a and 464b. When this occurs, the moving part contact point 462 closes the electrical circuit, thus creating a "limit hit" signal. A local electrical or digital latch built into or connected to the wireless unit 466a retains the limit hit signal. On each state change, the first wireless unit 466a transfers the new state to the remote wireless unit 466b.

Upon receiving the state change, the remote unit 466b updates the electrical or digital latch 468 with the new state. The external latch component 468 stores the latest state makes the latest state available for an external motion system. To the external motion system, the remote latch 468 appears as if it is directly connected to the motion limit contact points 464a and 464b.

The open (or closed) state of the limit stored by the remote electrical or digital latch 468 can then be queried by an external source or when coupled with more additional logic (either hardware, firmware or software) an interrupt or other event may be generated and sent to an external source (either hardware, firmware or software), indicating that the limit has been hit.

2. Wireless Latches

Each of the latch systems described in this document may also be connected to wireless units to transfer the data to a remote latch, or other hardware, software, or firmware system. The following sections describe a number of these configurations.

Figure 30:
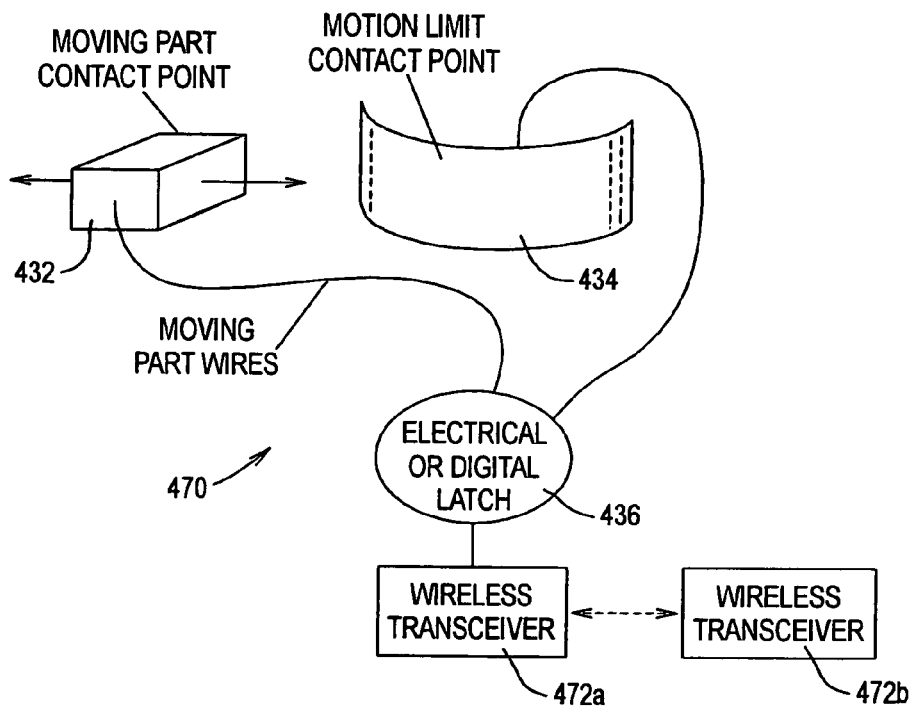
FIG. 30 is a schematic block diagram depicting the construction and operation of a seventh sensor system that may be used with the present invention.

FIG. 30 depicts the use of a simple contact proximity sensor system 470 having a contact arrangement similar to that depicted at 430 in FIGS. 22 and 23 above. The system 470 includes, in addition to the components of the system 430, local and remote wireless units 472a and 472b similar to the wireless units 466a and 466b described above. The local wireless unit 472a is configured to send a signal to the remote wireless unit 472b each time the latch state changes. In addition, the remote wireless unit 472b may query the local unit 472a at any time for the current latch state or to configure the latch state to be used when the circuit opens or closes.

Figure 31:
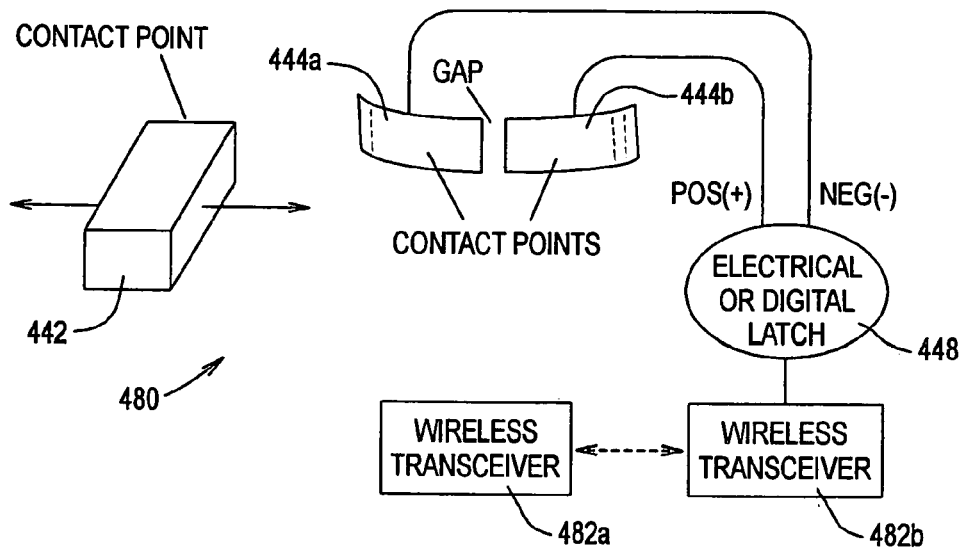
FIG. 31 is a schematic block diagram depicting the construction and operation of an eighth sensor system that may be used with the present invention.

FIG. 31 depicts a sensor system 480 having a contact arrangement similar to that depicted at 440 in FIGS. 24 and 25 above. The system 480 includes, in addition to the components of the system 440, local and remote wireless units 482a and 482b similar to the wireless units 466a and 466b described above. The local wireless unit 482a is configured to send a signal to the remote wireless unit 482b each time the latch state changes. In addition, the remote wireless unit 482b may query the local unit 482a at any time for the current latch state or to configure the latch state to be used when the circuit opens or closes.

Figure 32:
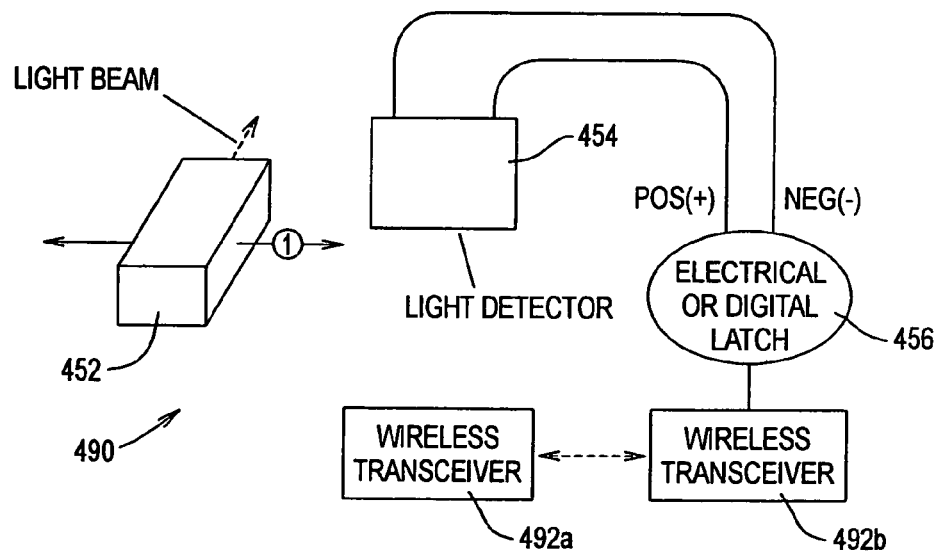
FIG. 32 is a schematic block diagram depicting the construction and operation of a ninth sensor system that may be used with the present invention.

Depicted at 490 in FIG. 32 is a sensor system 490 having a light detection arrangement similar to that used by the circuit depicted at 450 in FIGS. 26 and 27 above. The system 490 includes, in addition to the components of the system 450, local and remote wireless units 492a and 492b similar to the wireless units 466a and 466b described above. The local wireless unit 492a is configured to send a signal to the remote wireless unit 492b each time the latch state changes. In addition, the remote wireless unit 492b may query the local unit 492a at any time for the current latch state or to configure the latch state to be used when the circuit opens or closes.

From the foregoing, it should be clear that the present invention can be implemented in a number of different embodiments. The scope of the present invention should thus include embodiments of the invention other than those disclosed herein.

We claim:

1. A motion system comprising:
   a motion enabled device that performs motion operations based on motion commands;
   an event source that generates motion messages upon the occurrence of events, where the motion messages correspond to motion operations;

a plurality of message transceivers between which motion messages are transmitted; and a motion services system for mapping motion messages transmitted between the plurality of message transceivers to motion commands based on motion operations corresponding to mapped motion messages; whereby the motion services system performs motion operations based on motion commands corresponding to mapped motion messages.

2. A motion system as recited in claim 1, which the plurality of message transceivers allow motion messages to be transmitted over the computer network.

3. A motion system as recited in claim 2, in which the message transceivers instantly transmit motion messages over the computer network, network latencies notwithstanding.

4. A motion system as recited in claim 1, in which the message transceivers transmit motion messages in a predetermined format.

5. A motion system as recited in claim 1, in which the message transceivers and the motion services system are separate.

6. A motion system as recited in claim 1, in which the motion services system incorporates at least one of the message transceivers.

7. A motion system as recited in claim 1, in which the motion enabled device incorporates the motion services system.

8. A motion system as recited in claim 1, in which the motion enabled device incorporates at least one of the message transceivers.

9. A motion system as recited in claim 7, in which the motion enabled device incorporates at least one of the message transceivers.

10. A motion system as recited in claim 1, further comprising a plurality of motion enabled devices.

11. A motion system as recited in claim 10, in which at least one message transceiver is associated with each motion enabled device.

12. A motion system as recited in claim 10, in which at least one motion services system is associated with each motion enabled device.

13. A motion system as recited in claim 11, in which at least one message transceiver is associated with each motion enabled device.

14. A motion system as recited in claim 1, further comprising first and second networks and a server, where the server allows motion messages to be transmitted between the first and second networks.

15. A motion system as recited in claim 13, in which at least one message transceiver is connected to the first network and at least one message transceiver is connected to the second network.

16. A motion system as recited in claim 13, in which the event source is connected to the first network and the motion enabled device is connected to the second network.

17. A motion system as recited in claim 1, in which the event source is a speech to text converter that converts human speech into motion messages.

18. A motion system as recited in claim 16, in which the message transceivers and the motion services system are separate.

19. A motion system as recited in claim 16, in which the motion services system incorporates at least one of the message transceivers.

20. A motion system as recited in claim 16, in which the motion enabled device incorporates the motion services system.

21. A motion system as recited in claim 16, in which the motion enabled device incorporates at least one of the message transceivers.

22. A motion system as recited in claim 20, in which the motion enabled device incorporates at least one of the message transceivers.

* * * * *

UNITED STATES PATENT AND TRADEMARK OFFICE
CERTIFICATE OF CORRECTION

PATENT NO. : 7,024,255 B1 Page 1 of 1
APPLICATION NO. : 10/923149
DATED : April 4, 2006
INVENTOR(S) : David W. Brown and Jay S. Clark It is certified that error appears in the above-identified patent and that said Letters Patent is hereby corrected as shown below:

In Claim 2, column 25, line 12:

"the computer network." should be --a computer network.--

Signed and Sealed this

Twentieth Day of March, 2007

JON W. DUDAS
*Director of the United States Patent and Trademark Office*